United States Patent
Vieira

(10) Patent No.: US 10,243,892 B2
(45) Date of Patent: *Mar. 26, 2019

(54) SYSTEM AND METHOD FOR CONTROLLING ACCESS TO MEDIA CONTENT

(71) Applicant: BlackBerry Limited, Waterloo (CA)

(72) Inventor: Elvis Melo Vieira, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 367 days.

This patent is subject to a terminal disclaimer.

(21) Appl. No.: 14/992,824

(22) Filed: Jan. 11, 2016

(65) Prior Publication Data

US 2016/0191428 A1 Jun. 30, 2016

Related U.S. Application Data

(63) Continuation of application No. 13/480,416, filed on May 24, 2012, now Pat. No. 9,237,446.

(51) Int. Cl.
*H04M 3/42* (2006.01)
*H04L 12/58* (2006.01)
(Continued)

(52) U.S. Cl.
CPC ............ *H04L 51/04* (2013.01); *H04L 67/104* (2013.01); *H04W 12/08* (2013.01)

(58) Field of Classification Search
CPC ..... H04W 12/08; H04W 12/02; H04W 76/10; H04W 88/04; H04W 12/04
(Continued)

(56) References Cited

U.S. PATENT DOCUMENTS 8,587,476 B2 * 11/2013 Hung .................... G01S 19/14
342/357.31
9,237,446 B2 1/2016 Vieira
(Continued)

FOREIGN PATENT DOCUMENTS

EP 2439970 4/2012
WO 02/01864 1/2012

OTHER PUBLICATIONS

Search Report from corresponding European Application No. 12169363.4; search completed Oct. 10, 2012.
(Continued)

*Primary Examiner* — Joseph Arevalo
(74) *Attorney, Agent, or Firm* — Jeffrey N. Giunta; Fleit Gibbons Gutman Bongini & Bianco P.L.

(57) ABSTRACT

A system and method are provided for providing access to media provided by a media service. A first request and a second request are sent by the media service to a first device and a second device using a messaging protocol, the first request and second request being associated with the ability to access the particular media using the media service. The media service receives, via the messaging protocol, a first response from the first device and a second response from the second device. A determination is made as to whether the first response and the second response are compatible. A dispute resolution between the first device and the second device is initiated based on determining that the first response and the second response are not compatible. Access to the particular media provided by the media service is permitted or denied according to the dispute resolution.

18 Claims, 18 Drawing Sheets

(51) Int. Cl.
*H04W 12/08* (2009.01)
*H04L 29/08* (2006.01)

(58) Field of Classification Search
USPC ...... 455/414.1, 410, 3.05, 419, 412.1, 414.2
See application file for complete search history.

(56) References Cited

U.S. PATENT DOCUMENTS

| | | | |
|---|---|---|---|
| 2003/0156558 A1 | 8/2003 | Cromer et al. | |
| 2005/0114674 A1 | 5/2005 | Carley | |
| 2006/0209809 A1 | 9/2006 | Ellingham et al. | |
| 2008/0146211 A1 | 6/2008 | Mikan et al. | |
| 2009/0017750 A1 | 1/2009 | Marcinkiewicz | |
| 2009/0061837 A1* | 3/2009 | Chaudhri | G06F 3/0481 455/418 |
| 2009/0064314 A1 | 3/2009 | Lee | |
| 2009/0183010 A1 | 7/2009 | Schnell et al. | |
| 2009/0197569 A1 | 8/2009 | Gaznaghi et al. | |
| 2010/0313225 A1* | 12/2010 | Cholas | H04N 7/17318 725/62 |
| 2010/0330960 A1 | 12/2010 | Ravishankar et al. | |
| 2011/0095723 A1 | 8/2011 | Bhade et al. | |
| 2012/0124171 A1 | 5/2012 | Sparks | |
| 2012/0124178 A1* | 5/2012 | Sparks | H04L 67/06 709/219 |
| 2013/0060689 A1* | 3/2013 | Oskolkov | G06Q 20/10 705/42 |
| 2013/0316682 A1 | 11/2013 | Vieira | |
| 2013/0332621 A1 | 12/2013 | Keller et al. | |
| 2018/0048701 A1* | 2/2018 | Iwami | H04L 67/104 |

OTHER PUBLICATIONS

Inventor Name Search; Palm Intranet; retrieved May 11, 2014; <http://palmapps.uspto.gov/cgi-bin/expo/InvInfo/invquery.pl?FAM_NAME=Vieira&GIV_NAM=Elvis>.
Office Action dated May 15, 2014, received for U.S. Appl. No. 13/480,416.
Office Action dated Nov. 28, 2014, received for U.S. Appl. No. 13/480,416.
Office Action dated Apr. 2, 2015, received for U.S. Appl. No. 13/480,416.

* cited by examiner

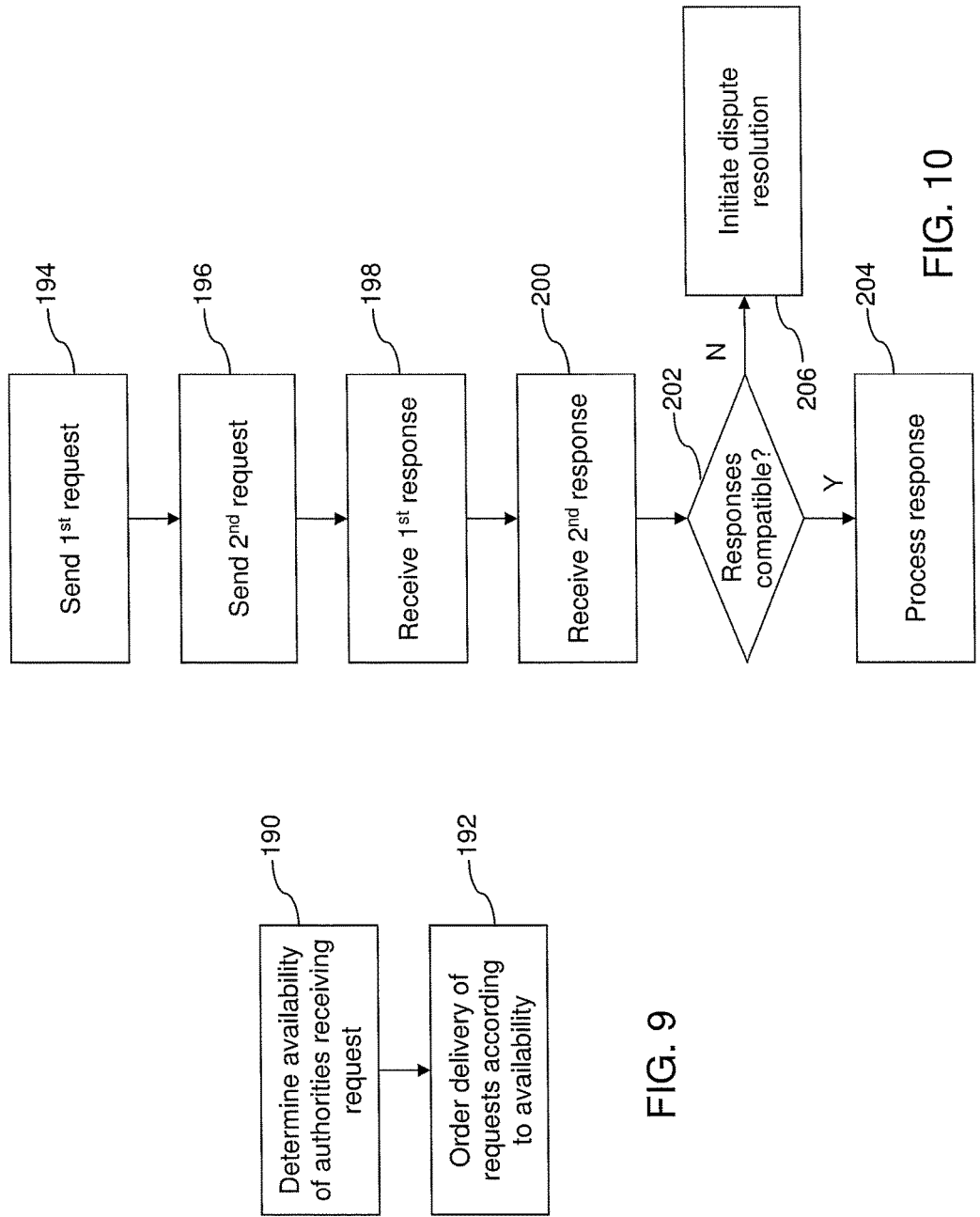

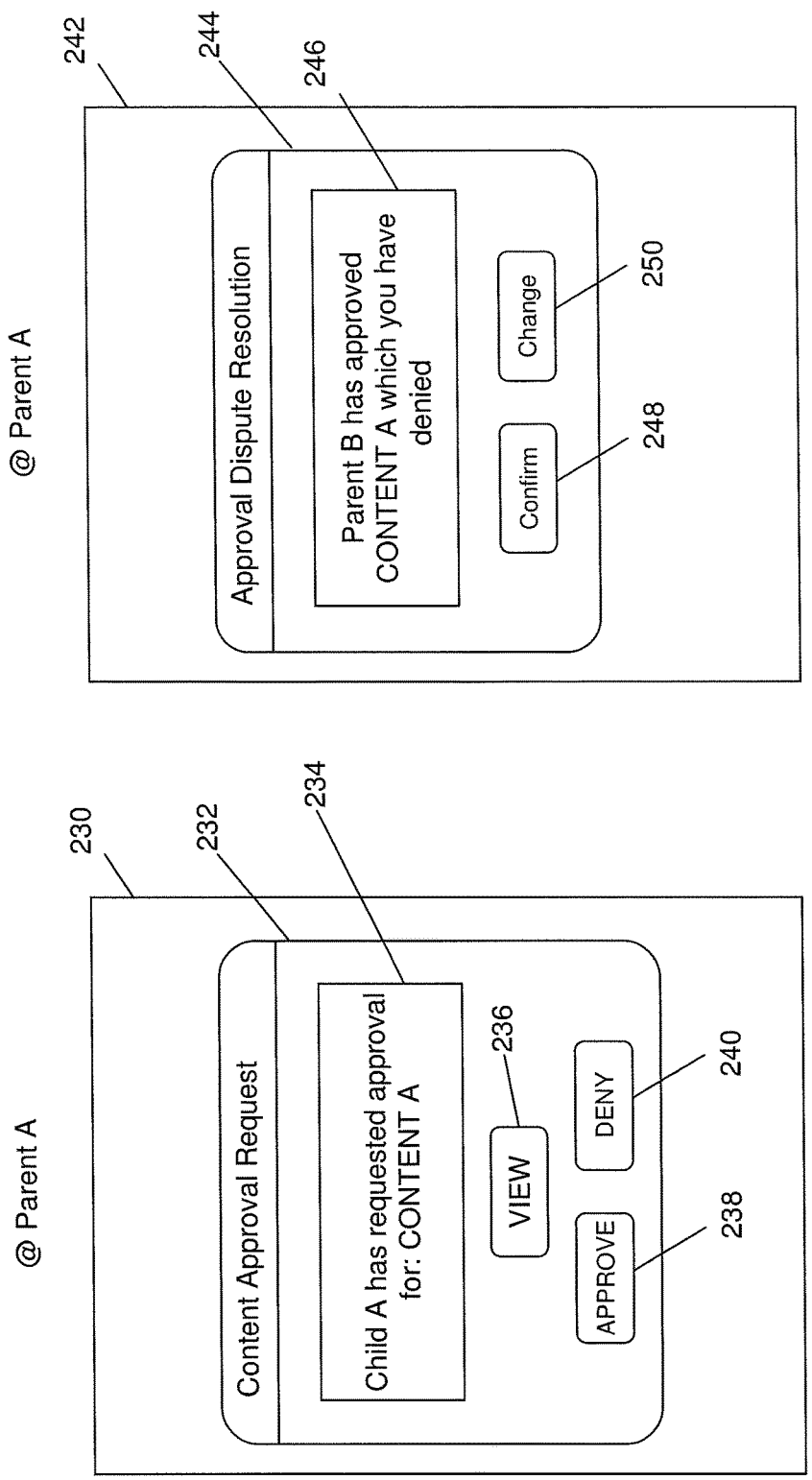

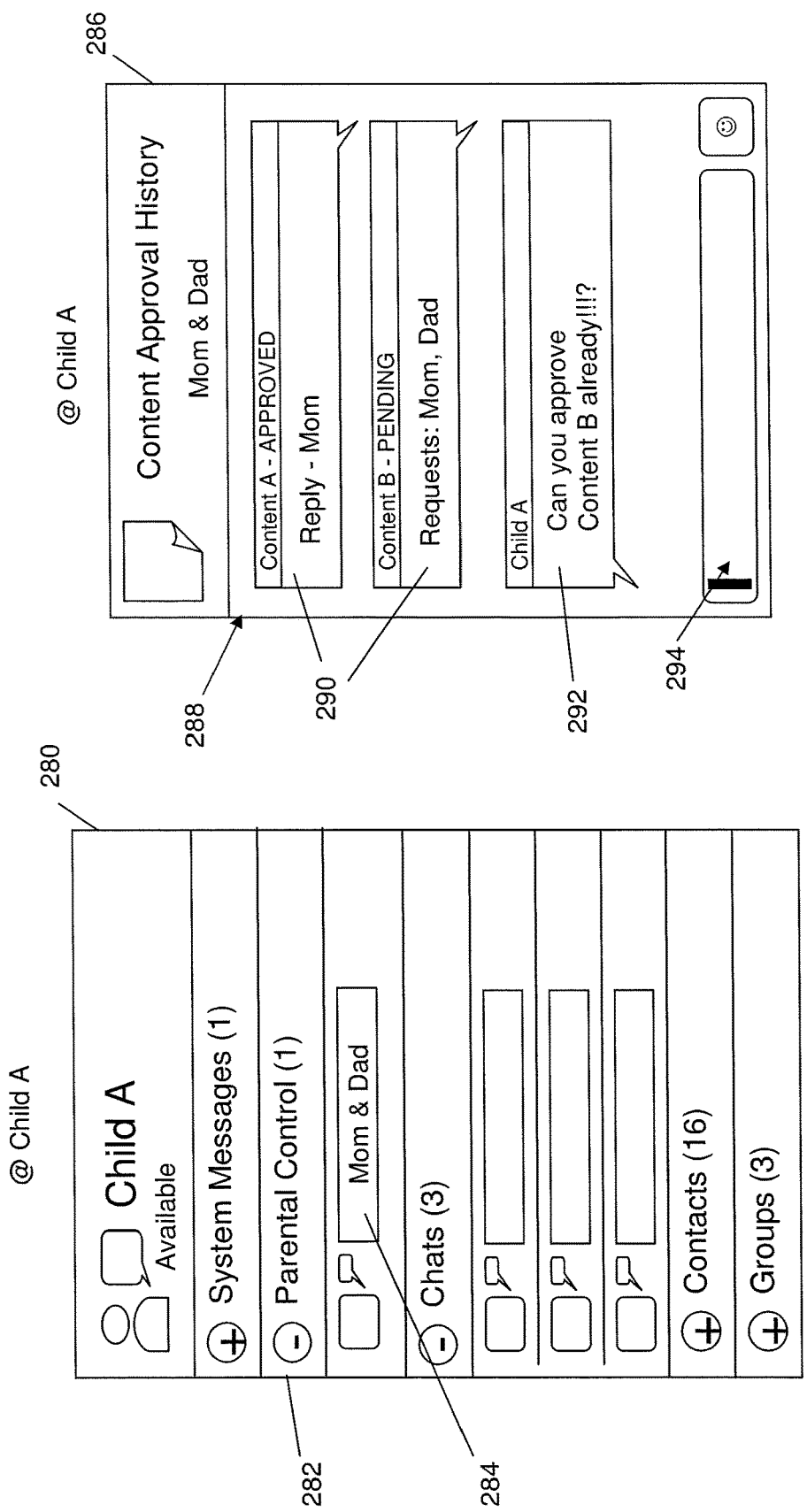

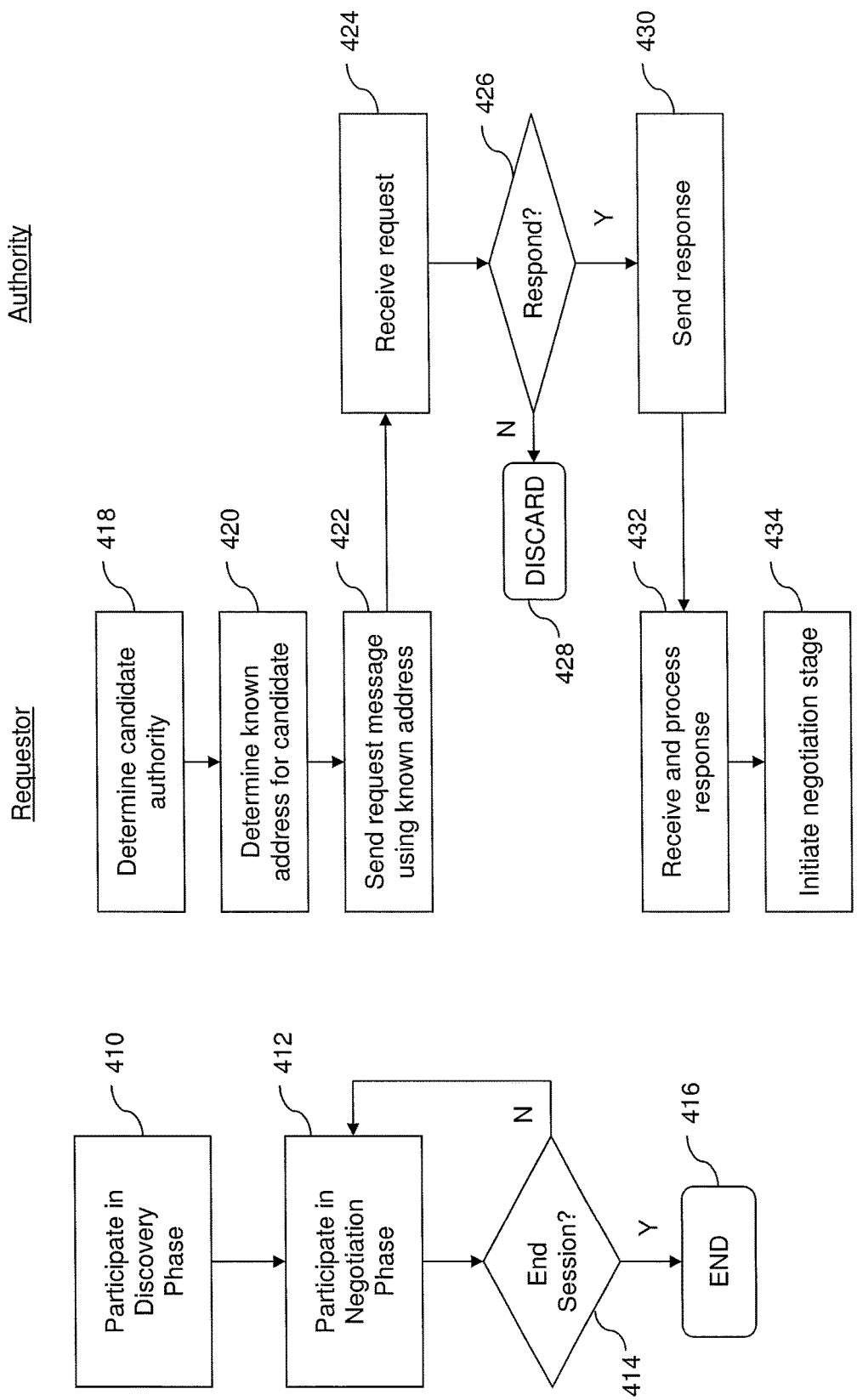

SYSTEM AND METHOD FOR CONTROLLING ACCESS TO MEDIA CONTENT

TECHNICAL FIELD

The following relates to systems and methods for controlling access to media content.

DESCRIPTION OF THE RELATED ART

The ubiquity of smart phones and other portable electronic devices that are capable of accessing various media has increased the concern by parents or other authority figures in what media content is being accessed, viewed, or otherwise obtained by children or those responsible to the authority figure.

For example, given the inherent portability of smart phones, inappropriate media content can be accessed by a child when they are not being directly supervised. Similarly, such portability may cause difficulties in restricting usage of smart phones for various purposes during specific times of the day.

BRIEF DESCRIPTION OF THE DRAWINGS

Embodiments will now be described by way of example only with reference to the appended drawings wherein:

FIG. 9 is a flow diagram illustrating an example of a set of computer executable operations that may be performed in ordering the delivery of multiple media access approval requests according to the availability of the authorities receiving the media access approval requests;

FIG. 10 is a flow diagram illustrating an example of a set of computer executable operations that may be performed in handling multiple media access approval requests and multiple media access permission responses;

FIG. 13 is a screen shot of an example of a prompt for obtaining a media access permission response to a media access request;

FIG. 14 is a screen shot of an example of a prompt for replying to a media access dispute notice;

FIG. 18 is a screen shot of an example of an instant messaging (IM) list view user interface (UI);

FIG. 19 is a screen shot of an example of an IM conversation UI;

FIG. 21 is a flow diagram illustrating an example of a set of computer executable operations that may be performed in communicating in a peer-to-peer session;

FIG. 22 is a flow diagram illustrating an example of a set of computer executable operations that may be performed in participating in a discovery phase for determining respective addresses for a peer-to-peer session;

DETAILED DESCRIPTION

Figure 1:
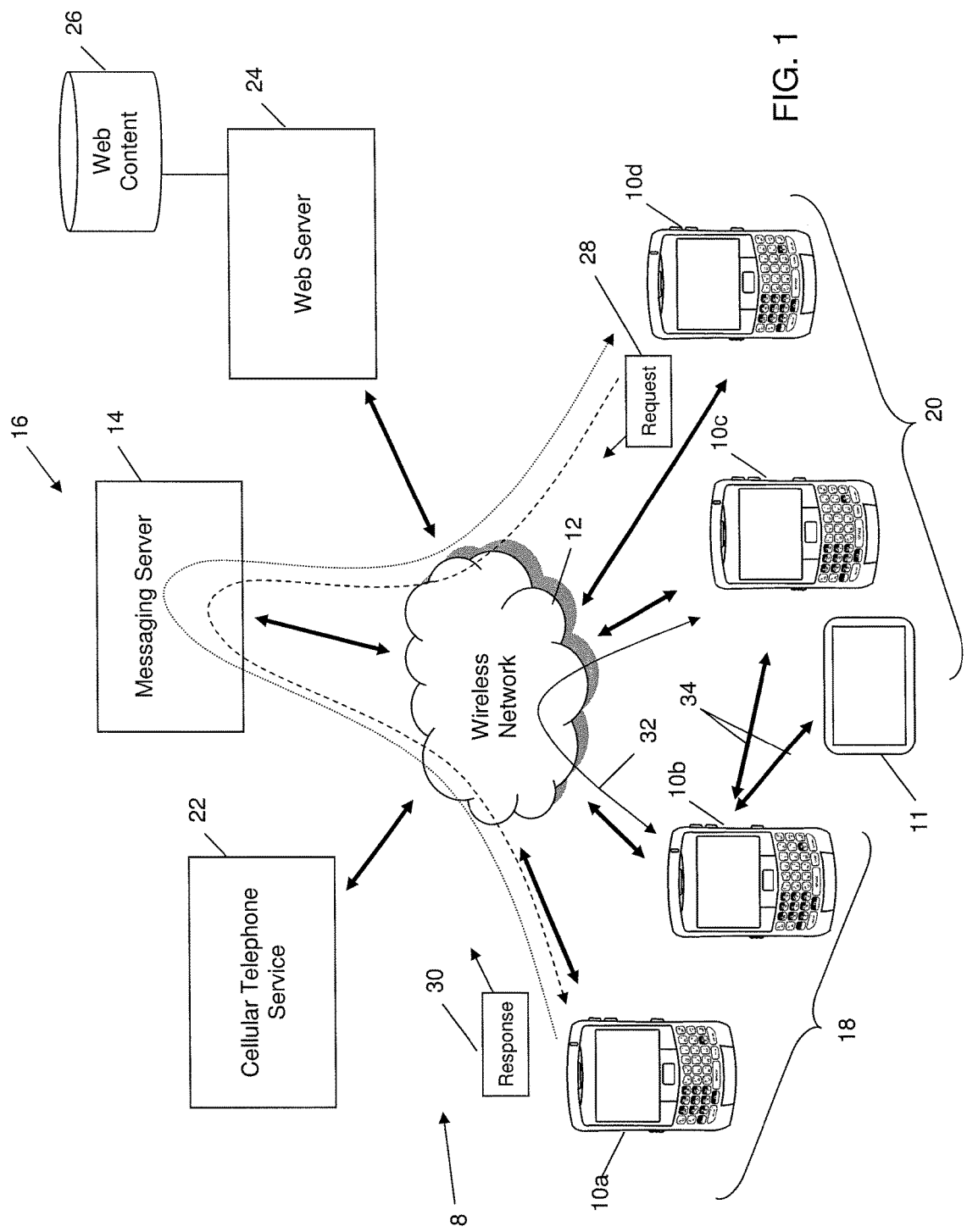
FIG. 1 is a block diagram of an example of a wireless communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practised without these specific details. In other instances, well-known methods, procedures and components have not been described in detail so as not to obscure the examples described herein. Also, the description is not to be considered as limiting the scope of the examples described herein.

To control access to media content on a mobile device, it has been recognized that the mobile device may be configured to utilize one or more of two communication modes for sending media access requests to an authority figure, and for obtaining responses from the authority figure. In one of the modes, a messaging service such as an instant messaging (IM) service, a peer-to-peer (P2P) protocol, or a local or otherwise short-range connection may be used for sending the media access requests to the authority figure, and for obtaining the responses from the authority figure. By using an IM service, P2P protocol, or local or short-range connections with multiple entities, requests can be sent to multiple designated authority figures to expedite the approval process, for example, if one particular authority figure is unavailable. Also, media access control policies can be stored in a central server or other device allowing responses to the media access requests to be responded to automatically. IM or other existing user interfaces can also be used to provide a convenient location to store and view requests and response for media access. Moreover, IM or other groups can be formed to allow one authority figure to propagate media access approvals and denials across multiple devices for which the authority figure is responsible.

In the other communication mode, a direct P2P connection is established allowing the requesting device and the device having authority to communicate directly with each other without an external entity, e.g., over Wi-Fi, Bluetooth, etc. The direct P2P mode may be used in various scenarios, including scenarios wherein at least one of the devices is unable to connect to an intermediate P2P system (e.g., wherein a tablet computer can connect to Wi-Fi but not a cellular network and the other device is also communicable via Wi-Fi).

FIG. 1 illustrates an example communication system 8 which enables various mobile devices 10a, 10b, 10c and 10d, referenced collectively or interchangeably herein as "mobile device 10," to communicate via a wireless network 12. In the example shown in FIG. 1, the wireless network 12 provides a medium over which mobile devices 10 can communicate with each other or other devices or entities (not shown) through a messaging server 14. For example, the messaging server 14 may be associated with an email, short message service (SMS), IM or other communication-based service or system in or related to a network infrastructure 16. The wireless network 12 also enables the mobile device 10a to communicate with a web server 24 that stores or otherwise has access to or provides web content 26. For example, the web server 24 may host a web page, be associated with a media service (e.g., streaming music or video), be associated with a social networking system, etc. FIG. 1 also illustrates a cellular telephone service 22, which may represent any component, device, server, entity or system that enables cellular telephone services on the mobile device 10a, wherein details thereof are omitted for clarity.

Mobile devices 10 which are to be monitored or controlled (controlled devices 20) by another entity such as an employer, parent or other authority figure (authorizer devices 18), can be operable to send requests 28 to the authority figure to gain access to desired media content via the wireless network 12. As discussed below, a messaging service, e.g., as a P2P service such as that provided by an IM application, can be used to send requests 28 to one or more recipients responsible for approving media content, in order to obtain a response 30 indicating whether or not the user of the mobile device 10d making the request can access the requested media content. For example, the mobile device 10d can be operable to request permission from a designated authority figure for a user that wishes to access a web page, download multimedia files, make a telephone call, etc.

As shown in FIG. 1, controlled device 20 may also utilize a P2P protocol providing a direct connection 32 through the wireless network 12 to one or more authorizer devices 18 to send requests 28 to the corresponding authorizer devices 18 to gain access to desired media content. Similarly, a local or otherwise short-range connection 34 between the controlled device 20 and the authorizer device 18, e.g., wherein two devices are within the same Wi-Fi network or such devices are within Bluetooth range, can also be used to send requests 28 to the corresponding authority figures to gain access to desired media content. It can be appreciated that tethered devices 11 such as tablet computers and the like may also be controlled by an authorizer device 18 via a short-range connection, such as Bluetooth.

Figure 2:
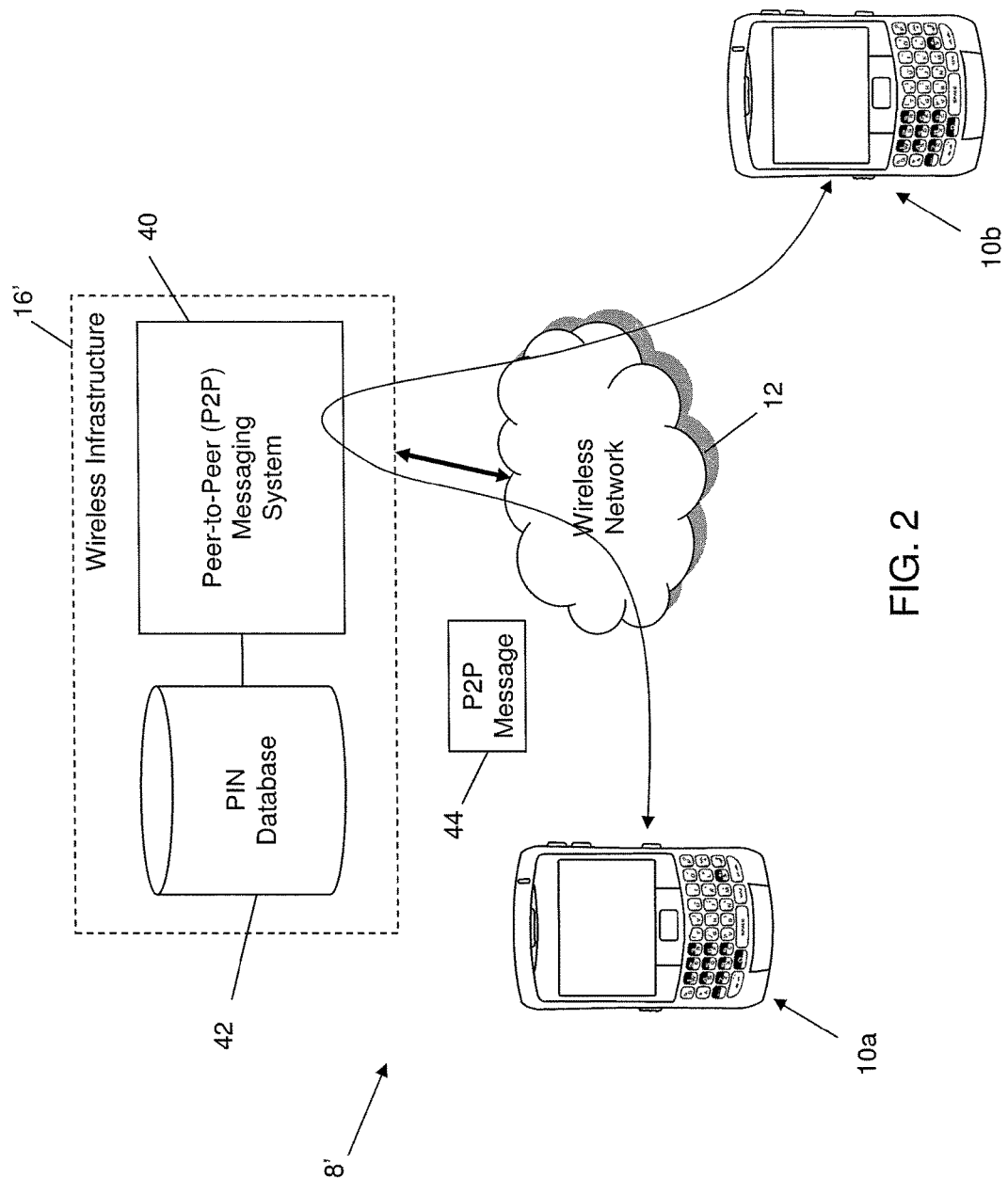
FIG. 2 is a block diagram of an example of a wireless communication system including a peer-to-peer (P2P) system.

An example of a communication system 8' including a wireless infrastructure 16', is shown in FIG. 2, which may be used to communicate in the first operation mode discussed above. The communication system 8' at least in part, enables mobile devices 10a, 10b, to communicate via a P2P messaging system 40 over the wireless network 12. It will be appreciated that the mobile devices 10 shown in FIG. 2 are for illustrative purposes only and many other mobile devices 10 (not shown) may also be capable of communicating with or within the communication system 8'. It will also be appreciated that although the examples shown herein are directed to mobile communication devices, the same principles may apply to other devices capable of communicating with the P2P system 40. For example, an application (not shown) hosted by a desktop computer or other "non-portable" or "non-mobile" device may also be capable of communicating with other devices (e.g., including mobile devices 10) using the P2P system 40.

The P2P system 40 is, in this example, a component of the wireless infrastructure 16' associated with the wireless network 12. The wireless infrastructure 16' in this example includes, in addition to the P2P system 40, and among other things not shown for simplicity, a personal identification number (PIN) database 42. The PIN database 42 in this example is used to store one or more PINs associated with respective mobile devices 10a, 10b whether they are subscribers to a service provided by the wireless infrastructure 16' or otherwise.

A first mobile device 10a may communicate with a second mobile device 10b and vice versa via the P2P system 40, in order to perform P2P messaging or to otherwise exchange P2P-based communications. For ease of explanation, in the following examples, any P2P-based communication may also be referred to as a P2P message 44 as shown in FIG. 2. It can be appreciated that only two mobile devices 10a, 10b are shown in FIG. 2 for ease of illustration and, for example, in an electronic group conversation, three or more mobile devices 10 would be participating in the group conversation.

Figure 3:
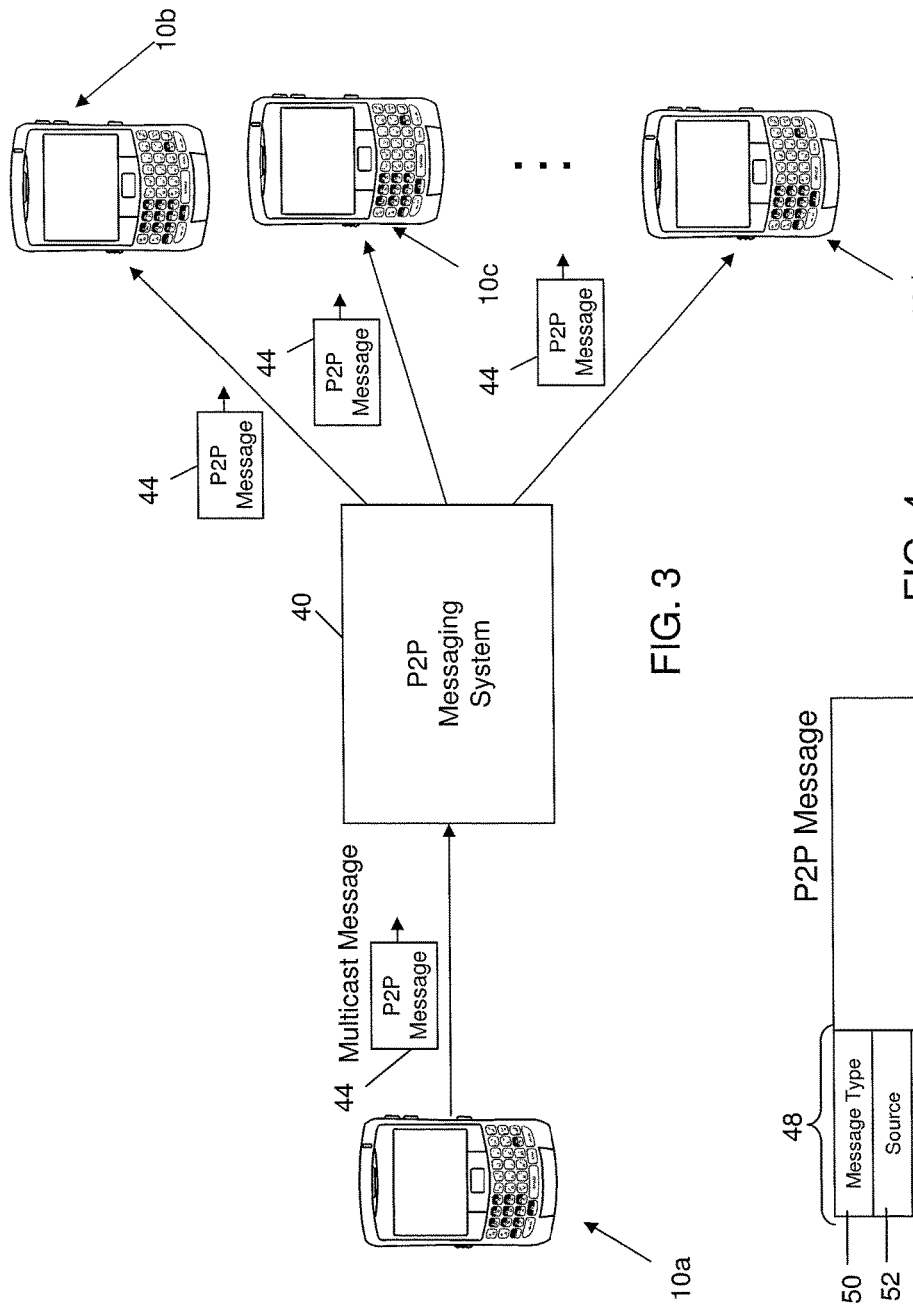
FIG. 3 is a block diagram of an example of a communication of a multi-cast P2P message via the P2P system of FIG. 2.

In some examples, the P2P system 40 may be capable of sending multi-cast messages, i.e. forwarding a single message from a sender to multiple recipients without requiring multiple P2P messages 44 to be generated by the sender. For example, as shown in FIG. 3, the P2P system 40 can be operable to enable a single P2P message 44 to be sent to multiple recipients by addressing the P2P message 44 to multiple corresponding P2P addresses, and having the P2P system 40 multicast the message 44 to those recipients.

Figure 4:
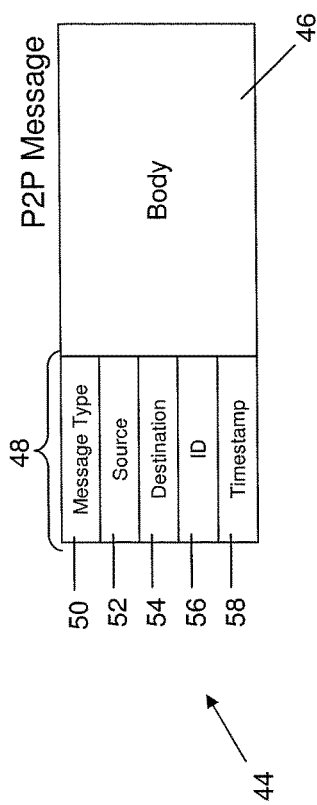
FIG. 4 is a block diagram illustrating an example of a P2P message.

An example of a P2P message 44 is shown in greater detail in FIG. 4, and has a format that is particularly suitable for a PIN-to-PIN based system. In a typical P2P protocol, each P2P message 44 has associated therewith a source corresponding to the mobile device 10 which has sent the P2P message 44 and includes a destination identifying the one or more intended recipients. Each P2P message 44 in this example includes a body 46, which contains the content for the P2P message 44 (e.g., text or other data), and a header 48, which contains various fields used for transmitting and processing each P2P message 44. In this example, the header 48 includes a message type field 50 to specify the type of transmission (e.g., chat, registration, block, presence, etc.), a source field 52 to specify the device address for the sender, a destination field 54 to specify the device address(es) for the one or more intended recipients, an ID field 56 to identify the corresponding P2P application (e.g., see IM application 68 in FIG. 5) and a timestamp field 58 to indicate the time (and if desired, the date) at which the P2P message 44 was sent by the designated sender.

It can be appreciated that in this example, the ID field 56 can be used to specify the application ID to identify a P2P application on the mobile device 10. Where the P2P application relates to, for example, an IM system, the message type field 50 can also be used to designate an IM communication, and the ID field 56 would then correspond to a conversation ID, i.e. a conversation thread the message 44 corresponds to (e.g., such that each P2P message 44 is identified by the conversation in which it was sent).

It will be appreciated that other information or attributes may be included in the P2P message 44, such as a subject field (not shown) to enable a subject for part or all of a conversation (in an IM example) to be transported with the P2P message 44 (e.g., to create new subjects, modify subjects, notify others of subjects, etc.), or application details field (not shown) to provide application-specific information such as the version and capabilities of the application.

The P2P system 40 can utilize any suitable P2P protocol operated by, for example, a P2P router (not shown), which may be part of the wireless infrastructure 16'. It can be appreciated however that a stand-alone P2P configuration (i.e. that does not rely on the wireless infrastructure 16'—not shown) may equally apply the principles herein. The P2P system 40 may also enable mobile devices 10 to communicate with desktop computers, thus facilitating, for example, communications such as instant messaging (IM) between mobile applications and desktop applications on the desktop computer.

Figure 5:
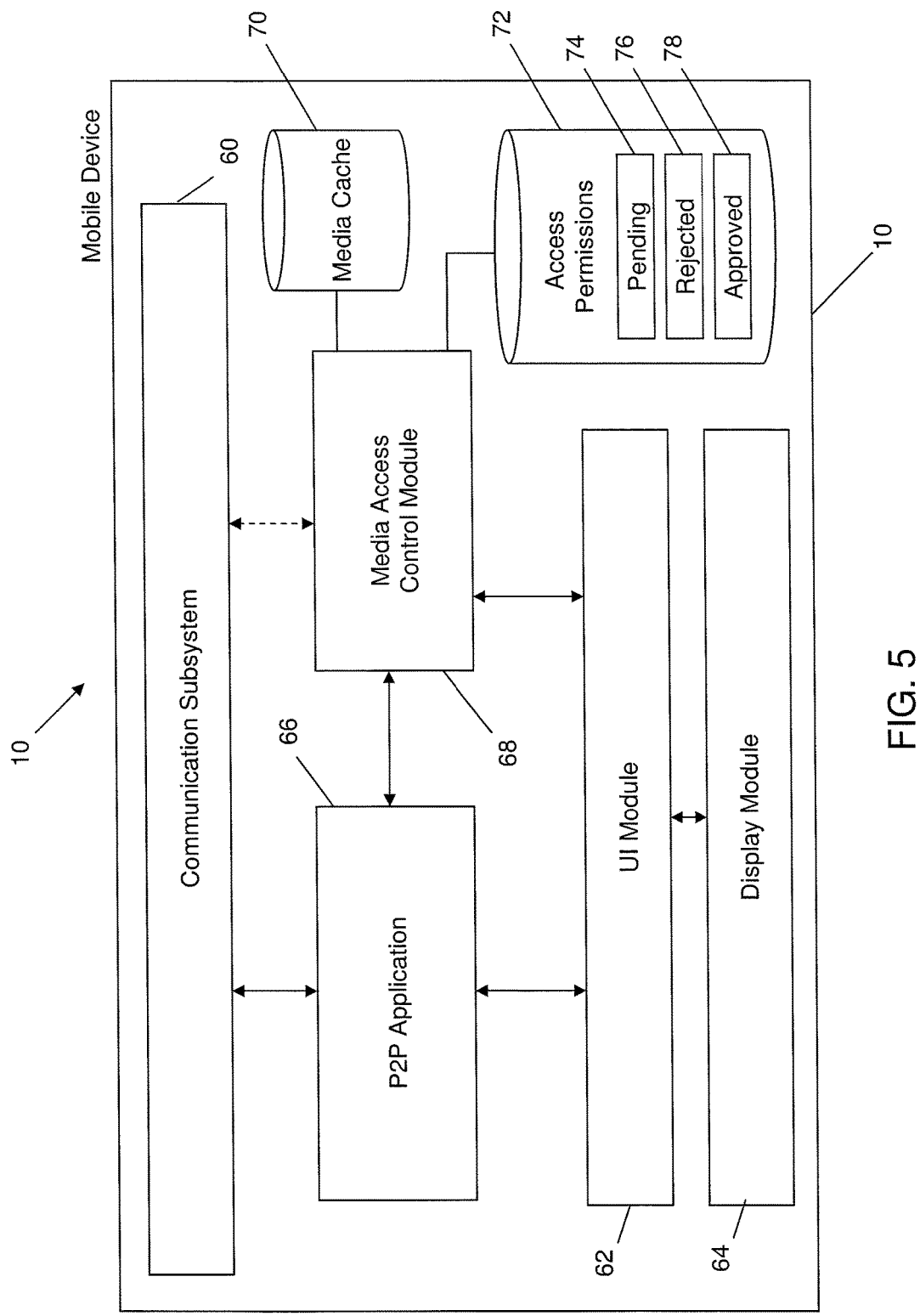
FIG. 5 is a block diagram illustrating an example of a configuration for a mobile device including a media access control module.

The P2P system 40 can be implemented using a router-based communication infrastructure, such as one that provides email, SMS, voice, Internet and other communications. Particularly suitable for hosting a P2P messaging router, is a wireless router or server used in systems such as those that provide push-based communication services. In FIG. 2, the wireless infrastructure 16' facilitates P2P communications such as instant messaging between mobile devices 10a, 10b. P2P messaging, such as IMing, is provided by an associated application stored on each mobile device 10, e.g., an IM application such as P2P application 66 as shown in FIG. 5, which can be initiated, for example, by highlighting and selecting an icon from a display as is well known in the art. The P2P system 40 routes messages between the mobile devices 10a, 10b according to the P2P protocol being used. For example, the P2P protocol may define a particular way in which to conduct IM or other types of messaging.

In general, in a P2P protocol, the sender of the P2P message 44 knows the address of the intended recipient, e.g., a PIN. This address knowledge may be established when the two devices request to add each other to their respective contact or buddy lists. A particular mobile device 10a can communicate directly with various other mobile devices 10b, 10c, 10d, through the P2P system 40 without requiring a dedicated server for facilitating communications. In other words, the P2P system 40 enables the mobile devices 10 to communicate with each other directly over the wireless infrastructure 16' in accordance with the P2P protocol.

When conducting a P2P session according to the example shown in FIG. 2, the mobile devices 10 can communicate directly with the wireless infrastructure 16' in a client based exchange where, as noted above, an intermediate server is not required. A P2P message 44 sent by one mobile device 10 is received by the wireless infrastructure 16', which obtains the address for the intended recipient (or recipients) from information associated with the P2P message 44 (e.g., a data log) or from the P2P message 44 itself. Upon obtaining the recipient's address according to the P2P protocol, the wireless infrastructure 16' then routes the P2P message 44 to the recipient associated with the mobile device 10 having such address (or recipients having respective addresses). The wireless infrastructure 16' typically also provides a delivery confirmation to the original sender, which may or may not be displayed to the user. The destination device can also provide such delivery information. The wireless infrastructure 16' may be capable of routing P2P messages 44 reliably as well as being capable of holding onto the P2P messages 44 until they are successfully delivered. Alternatively, if delivery cannot be made after a certain timeout period, the wireless infrastructure 16' may provide a response indicating a failed delivery. The wireless infrastructure 16' may choose to expire a P2P message 44 if a certain waiting period lapses.

Turning now to FIG. 5, an example of a configuration for a mobile device 10 is shown. In this example, a communication subsystem 60 is provided in order to enable the mobile device 10 to access communication networks such as the wireless network 12 shown in FIGS. 1 and 2. It can be appreciated that the communication subsystem 60 may be configured to or include a sub-module (not shown) to enable the mobile device 10 to communicate via one or more short-range protocols such as Wi-Fi, Bluetooth, infrared (IR), etc. It can also be appreciated that one or more additional communication subsystem modules (e.g., a short range communications subsystem 322—see FIG. 29) may also be included in the mobile device 10, e.g., Wi-Fi module, Bluetooth module, etc. The mobile device 10 also includes a user interface (UI) module 62 for rendering display elements or "screens" on a display screen of the mobile device 10 using a display module 64. It can be appreciated that the components shown in FIG. 5 are for illustrative purposes only and various other components that may be used by the mobile device 10 have been omitted for clarity. The mobile device 10 may have or otherwise support various applications.

FIG. 5 illustrates a P2P application 66 that is configured to communicate with the P2P messaging system 40, e.g., by accessing the wireless network 12 via the communication subsystem 60. A media access control module 68 is also provided, which is used to monitor and control access to various media, such as web content, voice services, messaging, images, videos, text, documents, etc. The media access control module 68 is configured to communicate with the P2P application 66 to utilize an associated P2P messaging service or protocol to obtain responses to media access requests. The media access control module 68 may also be configured to communicate with the UI module 62 for displaying messages, prompts, or other visual elements associated with media access control. The media access control module 68 in this example includes or otherwise has access to a media cache 70 to enable the media for which approval is being sought to be temporarily stored pending receipt of an approval response. The media access control module 68 also includes or otherwise has access to an access permissions data store 72. In this example, the access permissions data store 72 stores permissions associated with various media, including pending 74, rejected 76, and approved 78 media, to expedite subsequent access attempts for the same or related media. For example, a first attempt to access a particular web page may initiate a request for approval from a parent or authority figure using the P2P application 66 or its underlying P2P messaging service or protocol. Based on the media access response received, a subsequent attempt to access the web page can be allowed or blocked based on a saved permission (i.e. rejected 76 or approved 78) rather than sending a further approval request.

It can be appreciated that the authorizer devices 18 may also include a media access control module 68, media cache 70, and access permissions data store 72 to enable the entity responsible for approving or denying a media access request to cache the media content so that the content may be viewed, and to track access permissions. It can also be appreciated that the P2P application 66 can also be configured to include a media access control module 68 or provide similar functionality. For example, as discussed below, a chat history can be used to record media access requests and responses for later viewing. It can also be appreciated that the media access control module 68 can also be operable to send media access requests 28 and obtain responses 30 thereto using any other communication based application, module or program, using any suitable connection as shown by way of example in FIG. 1. As such, the examples described herein utilizing the P2P application 66 and communications via the wireless network 12 using the P2P messaging system 40 are for illustrative purposes only and the principles discussed herein equally apply to configurations in which other applications and/or communication protocols and connections are used.

Figure 6:
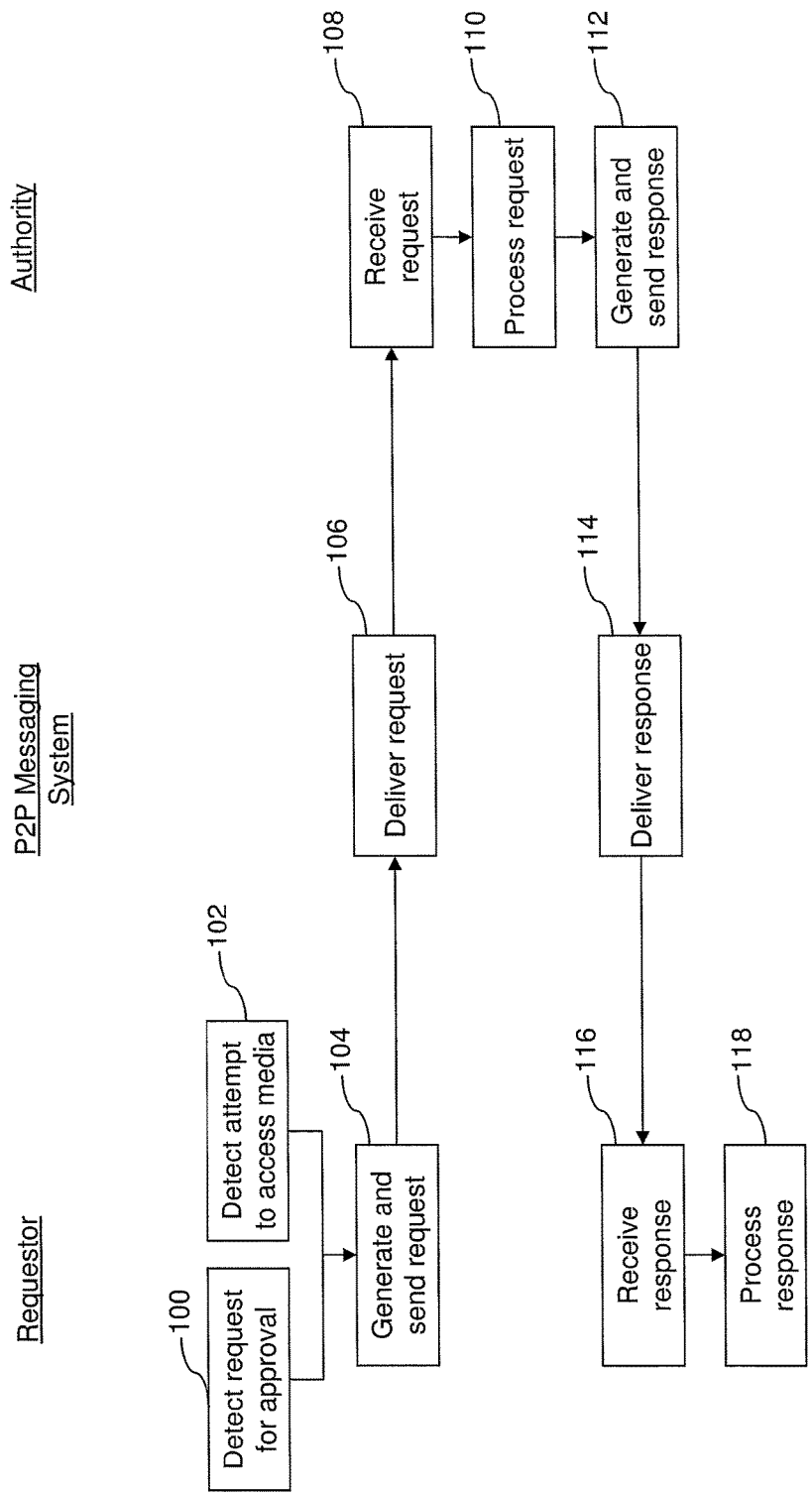
FIG. 6 is a flow diagram illustrating example computer executable operations that may be performed in obtaining media access approval from an authority device to access media on a requesting device.
Figure 7:
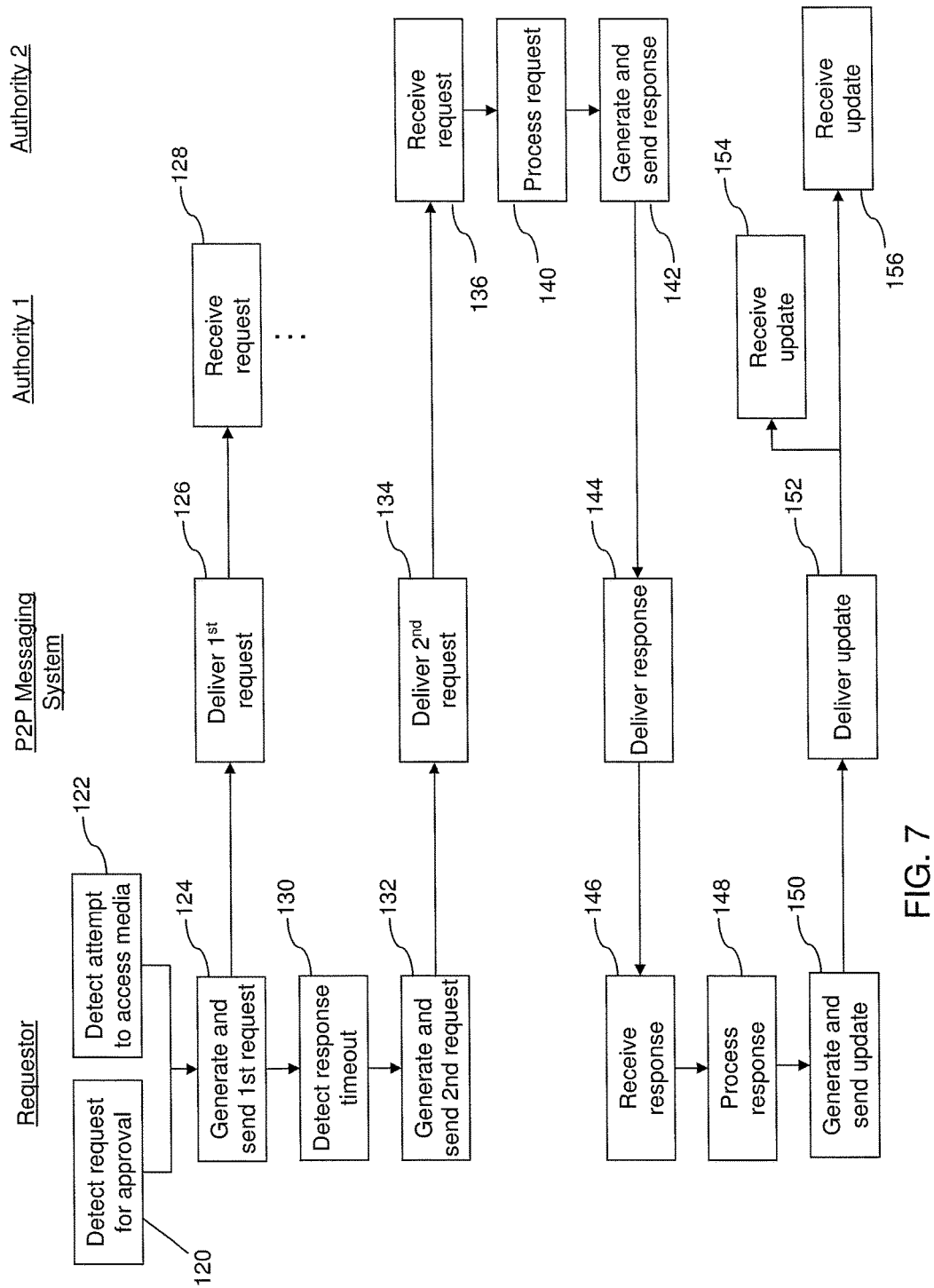
FIG. 7 is a flow diagram illustrating example computer executable operations that may be performed in obtaining media access approval from at least one of a plurality of authority devices.
Figure 8:
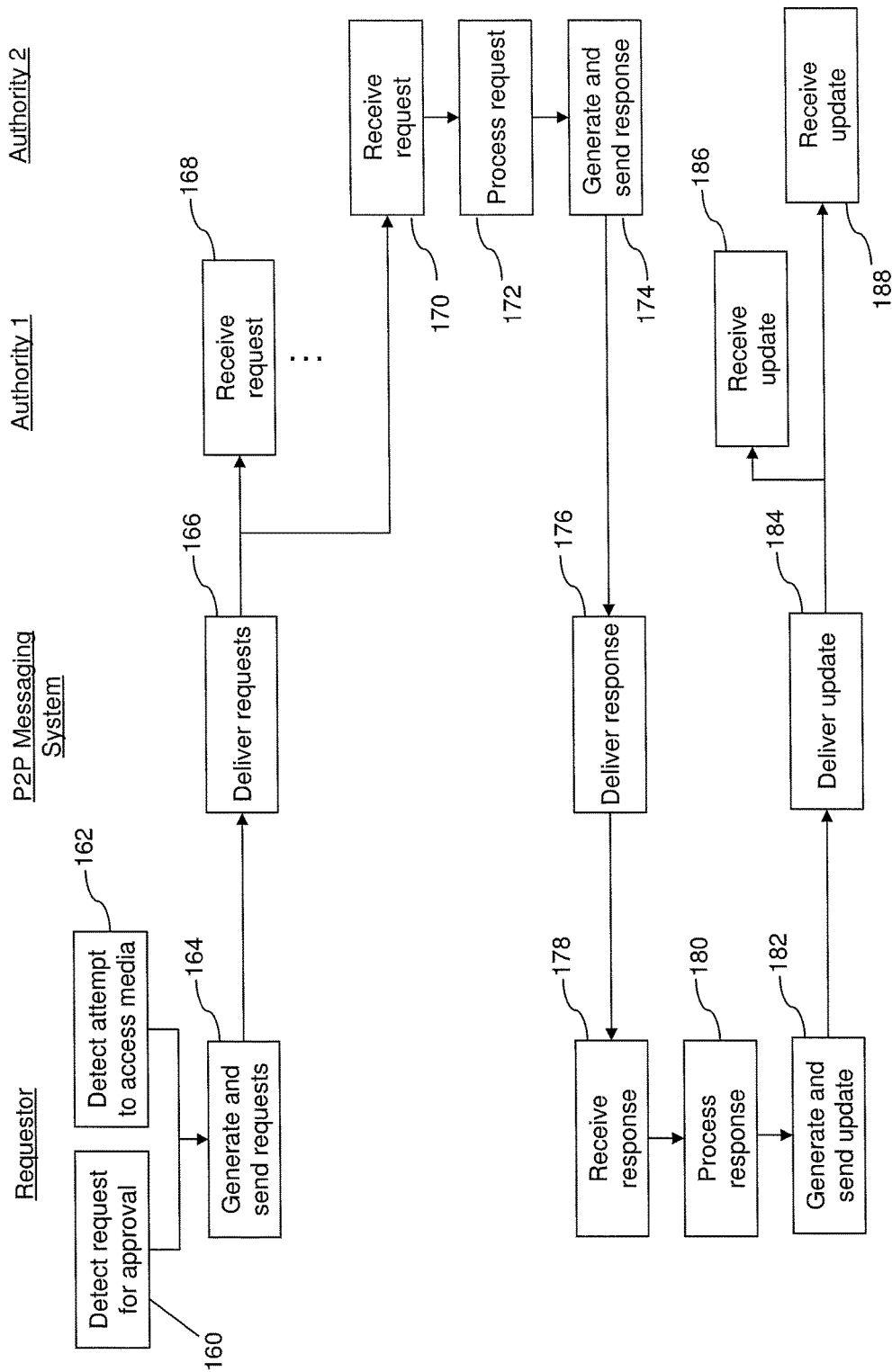
FIG. 8 is a flow diagram illustrating example computer executable operations that may be performed in obtaining media access approval from at least one of a plurality of authority devices.

FIG. 6 illustrates an example of operations that may be performed by one mobile device 10 (controlled device 20) in obtaining permission from an authority figure associated with another mobile device 10 (authorizer device 18) to access desired media content. At 100, the controlled device 20 associated with the requestor detects a request for approval, e.g., selection of a menu option or short-cut key by a user of the controlled device 20. Additionally or alternatively, the controlled device 20 associated with the requestor may detect an attempt to access media content, at 102. It can be appreciated that operations 100 and/or 102 may be performed by the media access control module 68 or equivalent functionality or program instructions provided by an application being used to access the desired media content. The media access control module 68 may then generate a request 28 or have the request 28 generated by the messaging-based application used. In the following examples the P2P application 66 is used to send the request 28, however, it can be appreciated that other messaging-based applications may be used according to the principles discussed herein. The request 28 is generated and sent, at 104, to one or more authorizer devices 18 associated with corresponding authority figures. In the example shown in FIG. 6, the request 28 is sent to one authority figure, however, as illustrated in FIGS. 7 and 8 and discussed below, the request 28 may be sent to multiple authority figures.

The P2P messaging system 40 delivers the request 28, at 106, e.g., by forwarding a P2P message 44 containing the request 28 according to a P2P protocol, and the request 28 is received by the authorizer device 18 for the authority figure, at 108. A media access control module 68 or other application or module on the authorizer device 18 may then process the request 28, at 110, in order to obtain a response 30 to the request 28 from the authority. For example, a prompt may be displayed to the user of the authorizer device 18, a new message indicator may be displayed in the P2P application 66, etc. Once a reply to the request 28 is obtained, a response 30 may be generated and returned to the controlled device 20, at 112. In this example, similar to the request 28, the response 30 is delivered to the requestor using the P2P messaging system 40, at 114, which is received by the requestor, at 116. The response 30 may then be processed by the controlled device 20 associated with the requestor to approve and allow access to the desired media content or deny access to the desired media content. It can be appreciated that the response 30 may also provide partial approvals or denials. For example, the response 30 may indicate that text from a web page can be accessed but not images or videos. Similarly, if the request 28 is generic, e.g., "can I contact my friend?"; the response 30 can be structured to provide an approval with conditions. For example, a parent may not allow a child to contact their friend by phone, but may permit them to send a P2P message 40 or email message. As such, it can be appreciated that the requests 28 and responses 30 can be configured not only to enable an authority to approve or deny media content or access to media or a service, but also to provide conditional responses 30 or selections from a list of options. This approval may also apply to the amount of media content allowed. For example, a parent may allow a child to phone a friend but for a limited amount of time.

The requestor may also send multiple media access requests 28 either to account for an unresponsive authority, to obtain a consensus amongst two or more authorities, or in an attempt to obtain a response 30 as quickly as possible. Referring now to FIG. 7, example operations are shown that may be performed by a controlled device 20 associated with a requestor in obtaining permission from a second authority (Authority 2) to access desired media content, when a first authority (Authority 1) cannot be reached or is otherwise nonresponsive. At 120, the controlled device 20 associated with the requestor detects a request for approval, e.g., selection of a menu option or short-cut key by a user of the controlled device 20. Additionally or alternatively, the controlled device 20 associated with the requestor may detect an attempt to access media content, at 122.

The media access control module 68 may then generate a first request 28 or have the first request 28 generated by the messaging-based application used. The first request 28 is generated and sent, at 124, to a first authorizer device 18 associated with Authority 1. The request 28 in this example is delivered to Authority 1, at 126, via the P2P messaging system 40 and Authority 1 receives the request 28, at 128. It can be seen in FIG. 7 that in this example, Authority 1 does not respond to the request 28, at least within a predetermined timeout period. In such an example, the controlled device 20 would detect a response timeout, at 130, and generate and send a second request 28 to the authorizer device 18 associated with Authority 2, at 132. It can be appreciated that the response timeout can include a predefined amount of time, can be user configurable, and can vary depending on the nature of the media for which access has been requested. For example, the timeout for requesting to make a phone call can be shorter than that for accessing content on a web page.

The second request in this example is delivered by the P2P messaging system 40, at 134, and is received by Authority 2, at 136. In this example, it can be seen that Authority 2 processes the request 28, at 140, and a response is generated and returned to the requestor, at 142. The P2P messaging system 40 delivers the response 30, at 144, which is received by the requestor, at 146, and processed by the requestor, at 148. By providing multiple requests 28, the requestor does not need to wait for a response 30 to the first request 28, which may take some time to be generated, if at all. Where multiple authority figures are able to provide the requisite approvals and denials of access to various media, the P2P messaging system 40 is particularly advantageous in obtaining a response 30 as quickly as possible.

When multiple requests 28 are sent, as shown in FIG. 7, an update can be generated and sent by the requestor, at 150, e.g., to confirm receipt of the response 30. Such an update may already exist as part of the protocol used by the P2P messaging system 40 or may be generated specifically for the request/response method shown herein. The update in this example is delivered by the P2P messaging system 40, at 152 to both Authority 1, at 154, and Authority 2, at 156. It can be appreciated that the update can be used by the authorizer device 18 associated with Authority 1 to either cancel the request 28 or otherwise notify the user that a response 30 is not required. Moreover, the update can indicate to Authority 1 that Authority 2 has provided a response 30 and the nature of the response 30 such as whether access to the media content or service has been approved or denied.

It can be appreciated that the update may instead be generated by the P2P messaging system 40. For example, after detecting that the controlled device 20 associated with the requestor has received the response 30, the P2P messaging system 40 can send an update to Authority 1 to cancel the request 28 (to avoid multiple responses) and to Authority 2 to confirm that the response 30 was delivered.

It can also be appreciated that the requests 28 may be processed and the responses 30 generated automatically without user involvement. For example, a parent or administrator may utilize a set or rules or media access policy to automatically approve or deny media access requests 28 base on various criteria such as the nature of content, the source of content, time of day, other participants (e.g., in a phone call), etc. A hybrid response process can also be used wherein a first stage of automatic processing is performed for media access requests 28 that are routine, and a second stage of manual processing is requested if the response 30 cannot be generated in the first stage.

FIG. 8 illustrates another example wherein multiple requests 28 are sent to multiple authorities at the same time rather than waiting for a timeout period to expire before requesting permission from a second authority. At 160, the controlled device 20 associated with the requestor detects a request for approval, e.g., selection of a menu option or short-cut key by a user of the controlled device 20. Additionally or alternatively, the controlled device 20 associated with the requestor may detect an attempt to access media content, at 162. The media access control module 68 may then generate a request 28 or have the request 28 generated by the messaging-based application used. The request 28 is generated and sent, at 164, and addressed to both Authority 1 and Authority 2. The request 28 in this example is delivered to Authority 1 and Authority 2 via the P2P messaging system 40. Authority 1 receives the request 28, at 168, and Authority 2 receives the request 28, at 170. It can be seen in FIG. 8 that in this example, although Authority 1 is nonresponsive, Authority 2 can process the request, at 172, without the delay associated with a timeout period with respect to serial requests 28 (e.g., as shown in FIG. 7). The authorizer device 18 may then generate and send a response 30, at 174, which in this example is delivered by the P2P messaging system 40, at 176, to the requestor. The controlled device 20 associated with the requestor receives the response, at 178, and processes the response, at 180. Similar to the example shown in FIG. 7, an update may be generated and sent by the media access control module 68, at 182. The update is then delivered, at 184, by the P2P messaging system 40 to Authority 1 and Authority 2, wherein Authority 1 receives the update, at 186, and Authority 2 receives the update, at 188. It can be appreciated that the update can be used by the authorizer device 18 associated with Authority 1 to either cancel the request 28 or otherwise notify the user that a response 30 is not required. Moreover, the update can indicate to Authority 1 that Authority 2 has provided a response 30 and the nature of the response 30 such as whether access to the media content or service has been approved or denied.

It can be appreciated that the update may instead be generated by the P2P messaging system 40. For example, after detecting that the controlled device 20 associated with the requestor has received the response 30, the P2P messaging system 40 can send an update to Authority 1 to cancel the request 28 (to avoid multiple responses) and to Authority 2 to confirm that the response 30 was delivered.

In the example shown in FIG. 7, the order in which the requests are generated and sent can be determined according to the likely availability of the authorities. For example, if presence information is known about both authorities and the presence information indicates that one authority is more available than the other, the first request can be sent to the authority that is most available. For example, if the presence information indicates that Authority 1 is "Available" and Authority 2 is "Busy", the requests may be sent in the order shown in FIG. 7. It can be appreciated that the same principles may be applied to any plurality of authority figures.

FIG. 9 illustrates example operations that may be performed by the media access control module 68 or P2P application 66 to prioritize serially delivered requests. At 190, the media access control module 68 determines the availability of the authorities that are eligible to receive the request 28 (e.g., determine presence information associated with both parents or with multiple administrators in an enterprise environment), and orders the delivery of the requests 28 according to the availability of the authorities, at 192.

In examples wherein the request 28 is provided to only a single authority, it can be appreciated that processing the response 30 in operation 118 of FIG. 6 may be relatively simple since the media access control module 68 determines whether the response 30 includes an approval, denial, or conditional approval, and provides access to the requested medium and/or content accordingly. When multiple requests 28 are sent, as shown in FIGS. 7 and 8, multiple responses 30 may also be received (not shown).

FIG. 10 illustrates an example set of operations that may be performed by the media access control module 68 in processing multiple responses. A first request 28 is sent to, for example, Authority 1, at 194, and a second request 28 sent to, for example, Authority 2, at 196. Subsequent to sending the requests 28, a first response 30 is received from one of the authorities, at 198, and a second response 30 is received from the other of the authorities, at 200. The media access control module 68 may then compare the responses 30, at 202, to determine if they are the same or otherwise compatible. For example, if one authority provides approval and the other provides conditional approval, the stricter set of conditions can be enforced. If the responses 30 are equal or compatible, the access right(s) indicated in the response 30 is/are processed, at 204. If the responses 30 are not compatible, a dispute resolution process may be initiated, at 206. For example, if one response 30 indicates that the request 28 should be granted while the other response 30 indicates that the request should be denied, the dispute resolution process can be used to at least notify to the authorities of the discrepancy. It can be appreciated that the process shown in FIG. 10 may be extended to any plurality of requests 28 and corresponding responses 30.

Figure 12:
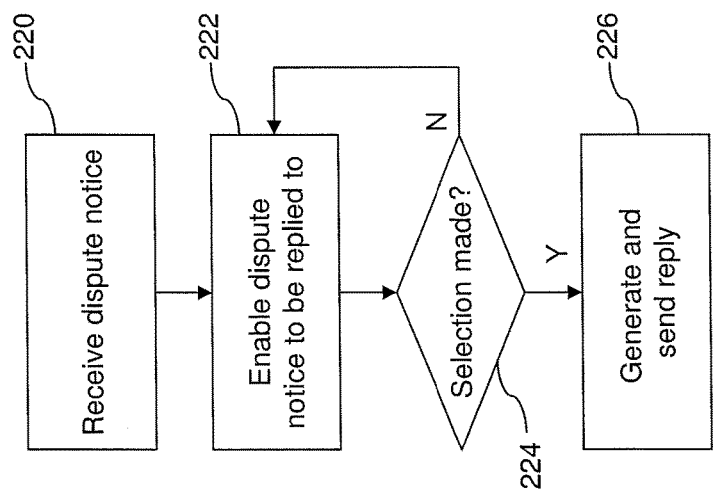
FIG. 12 is a flow diagram illustrating an example of a set of computer executable operations that may be performed in providing a media access response dispute notice to an authority device.
Figure 11:
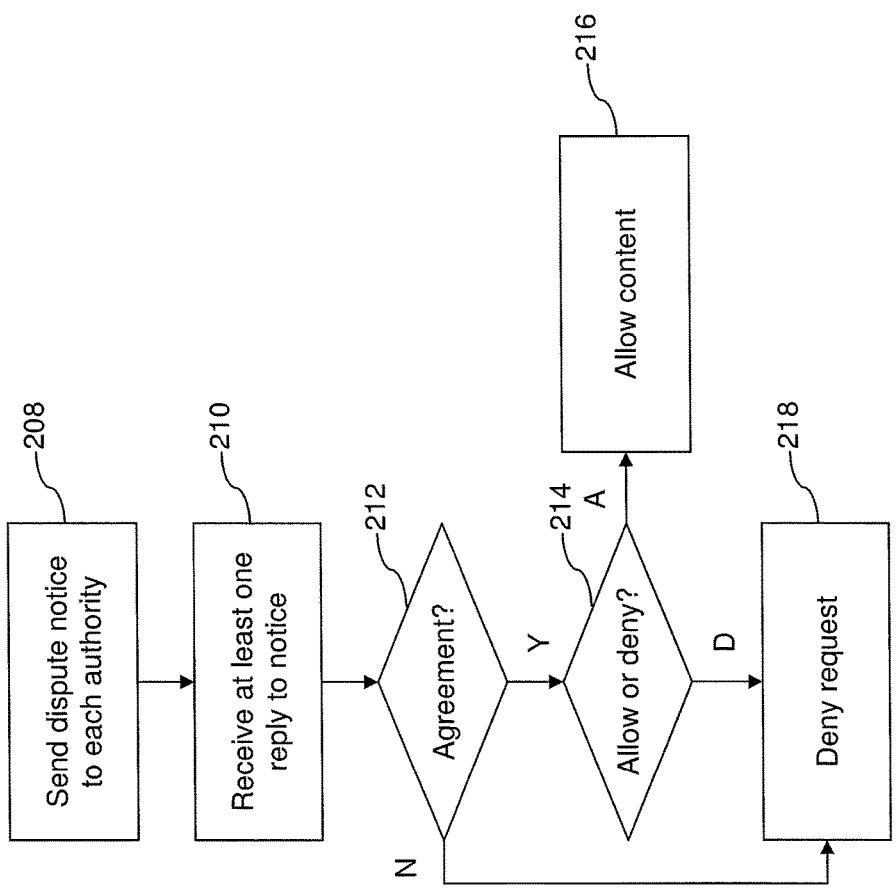
FIG. 11 is a flow diagram illustrating an example of a set of computer executable operations that may be performed in resolving a dispute between media access permission responses received from multiple authority devices.

An example dispute resolution process is illustrated in FIGS. 11 and 12. FIG. 11 illustrates an example set of operations that may be performed by the requestor when multiple responses 30 are received but are not compatible. At 208, a dispute notice is sent to each authority that has provided a response 30. Assuming that at least one authority responds to the dispute notice, at least one reply to the notice is received, at 210. The media access control module 68 may then determine, at 212 whether or not there is agreement with respect to the dispute or, in other words, the dispute has been resolved. It can be appreciated that if multiple replies to the dispute notice are received, a comparison can be made to determine if one of the authorities has agreed to change their response 30. For example, an authority that previously permitted access to the requested media may reconsider in view of the opposing view of the other authority and block access to the media or otherwise deny the request 28. If there is still no agreement, the media access control module 68 may, by default, deny the request, at 218. If an agreement or resolution is determined, at 212, the media access control module 68 then determines, at 214, whether the agreement is to allow or deny the request 28 and allows the content, at 216, or denies the content, at 218.

FIG. 12 illustrates example operations that may be performed by an application or media access control module 68 on an authorizer device 18 associated with an authority in participating in the dispute resolution process. A dispute notice is received, at 220, and the authorizer device 18 associated with the recipient authority enables the dispute notice to be replied to, at 222. For example, as discussed below, a prompt, message or other mechanism may be used to draw the dispute notice to the attention of the authority. The media access control module 68 determines, at 224, whether or not a selection or other reply to the dispute notice has been made. Once a selection has been detected, a reply to the dispute notice may be generated and sent to the requestor, at 226.

FIG. 13 illustrates a screen shot 230 of an example content approval request prompt 232 that may be displayed on an authorizer device 18 associated with an authority. In this example, the authority is Parent A. The prompt 232 in this example includes a message 234 indicating that: "Child A has requested approval for CONTENT A", wherein CONTENT A may provide a brief description, title, or other identifier related to the media access request. In other examples, the message 234 may indicate that Child A is attempting to call Friend X, or Child A is attempting to use a browser during school hours, etc. The prompt 232 shown in FIG. 13 enables the authority to select a view button 236 to view the content associated with the request 28, to select an approve button 238 to approve the request 28, or a deny button 240 to deny the request 28. It can be appreciated that the view button 236 may be optionally displayed according to the nature of the request 28. For example, if the request is associated with access to a media service, there may be nothing to view.

FIG. 14 illustrates a screen shot 242 of an example approval dispute resolution prompt 244 that may be displayed on an authorizer device 18 associated with an authority participating in the dispute resolution process. In this example, the authority is Parent A. The prompt 244 includes a message 246 indicating the nature of the dispute, in this example: "Parent B has approved CONTENT A which you have denied". A confirm button 248 is provided to enable Parent A to confirm their previous response 30 and a change button 250 is provided to enable Parent A to reconsider and change their response 30.

Figures 15, 16, 17:
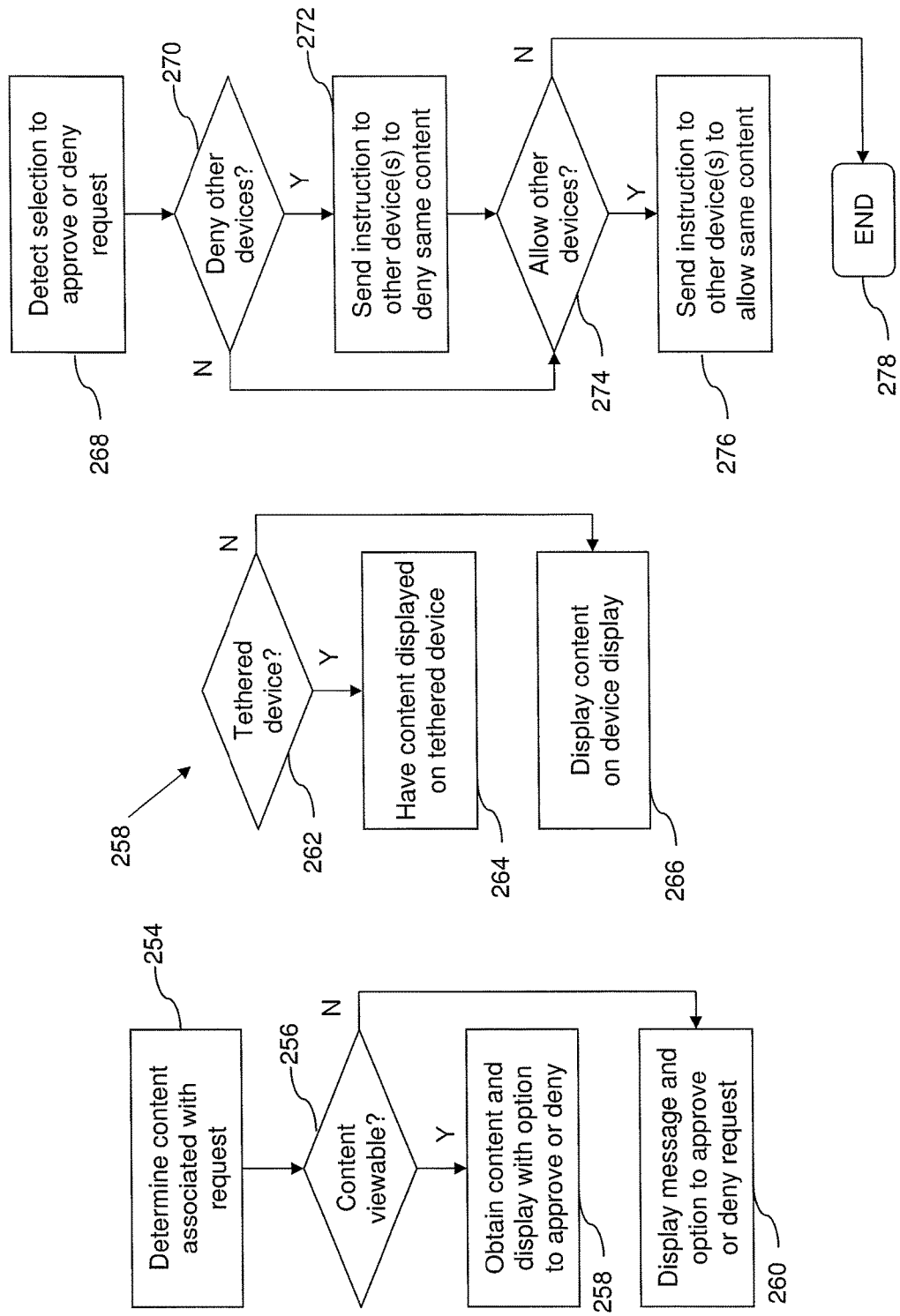
FIG. 15 is a flow diagram illustrating an example of a set of computer executable operations that may be performed in determining whether to display media content for which approval is being sought.
FIG. 16 is a flow diagram illustrating an example of a set of computer executable operations that may be performed in displaying media content for which approval is being sought.
FIG. 17 is a flow diagram illustrating an example of a set of computer executable operations that may be performed in enabling approval or denial for media content associated with an initial media access request to be applied to multiple controlled devices.

FIG. 15 illustrates an example set of operations that may be performed by the media access control module 68 in enabling content associated with a request 28 to be viewed, e.g., by providing a view button 236 as shown in FIG. 13. The operations shown in FIG. 15, for illustrative purposes, assume that the request 28 is associated with media that can also be accessed by the authorizer device 18 associated with the authority, e.g., a web page. The media access control module 68 determines, at 254, what content is associated with the request 28 and determines, at 256, if the content is viewable. If the content is viewable, the content is obtained by the mobile device 10 (e.g., as instructed by the media access control module 68), and displayed, at 258, with an option to approve or deny the content. If the content is not viewable, e.g., if the content is subscription based, a message or other indicator is displayed, at 260, with an option to approve or deny the request 28. For example, if the requestor is attempting to download Song X by Artist Y from Service Z, an indication reflecting this can be displayed instead of attempting to obtain Song X.

FIG. 16 illustrates an example set of operations that may be performed during operation 258 in FIG. 15 to take advantage of a tethered device such as a tablet computer. At 262, the media access control module 68 determines whether or not the authorizer device 18 is tethered to another device, e.g., one that has a larger screen size or more favorable network access terms. If the authorizer device 18 is tethered, the content may be displayed on the tethered device, at 264. In this way, a larger screen can be used to provide a clearer view of the content. Moreover, if the tethered device utilizes Wi-Fi access to obtain the content, bandwidth over the wireless network 12 can be reduced and costs associated with a data plan minimized. If the authorizer device 18 is not tethered to another device, the content may be displayed on the authorizer device 18, at 266.

FIG. 17 illustrates an example set of operations that may be performed by a media access control module 68 or other application or service on an authorizer device 18 to apply an approval or denial associated with a response 30 to at least one other controlled device 20 than that associated with the requestor. The media access control module 68 of the authorizer device 18 detects a selection made by the authority to approve or deny a request 28, at 268. The media access control module 68 may then determine, at 270, whether or not to deny the request to others. If denied, an instruction may be sent to one or more other controlled devices 20 to deny the same content, at 272. It can be appreciated that the different responses 30 can be applied to different controlled devices 20 according to the same request 28. For example, if an older sibling requests to access content that, although acceptable for that sibling, is not for a younger sibling, the parent can preemptively deny the content to the younger sibling to avoid receiving the same request 28 from the younger sibling. In this way, content that is being approved or denied can be vetted once for an entire family or group and appropriate responses 30 generated accordingly. The same operations may be performed in an enterprise environment wherein an administrator can handle an initial request 28 and apply a policy based on the request 28 to multiple employees.

As discussed above, the media access control module 68 may enable the authority to apply both denials and approvals to the same request 28 over a group of controlled devices 20. The media access control module 68 determines, at 274, whether or not to allow the action or content associated with the access request 28 for at least one controlled device 20. If allowed, an instruction is sent to the at least one other controlled device 20, at 276. If not, the process ends, at 278.

P2P applications 66, for example, IM applications, provide a convenient interface for generating requests 28, receiving requests 28, processing requests 28, generating responses 30, processing responses 30, and storing information related exchanges between requestors and authorities. FIG. 18 illustrates a screen shot of an example IM list view UI 280. Of the categories listed in the list view UI 280 is a parent control category 282. The parent control category 282 includes an IM conversation entry 284 that may be used to access an IM conversation UI 286 as shown in FIG. 19. Turning now to FIG. 19, the IM conversation UI 286 in this example identifies the authority figures, namely Mom & Dad, and identifies the conversation as being associated with content approval history. In this example, the IM conversation UI 286 includes a message history portion 288. Two incoming messages 290 regarding Content A and Content B are displayed, wherein Content A has been approved by "Mom" and Content B is pending and requests 28 have been sent to "Mom, Dad". An outgoing message 292 is also shown with a reminder regarding Content B. A message composition portion 294 is provided to enable the user to compose and send such outgoing messages 292. It can be appreciated that by providing messages 290, 292 associated with requests 28 and responses 30 for media access, not only can the requestor view past requests 28 and responses 30 but can participate in a dialogue with the authority or authorities, e.g., to provide further context or reasoning for granting access or conditional access. An IM conversation UI 286 can also be provided for the authority to enable the authority to view previous requests, reconsider previous decisions, and to corresponding with the requestor with the context of the request 28 conveniently located in the same UI.

As discussed above, it has also been recognized that a direct channel of communication may be established between two electronic devices in a second mode of communication, both for having media content approved or authorized as described herein, and for various other use cases. FIGS. 20 to 28 illustrate an example of a communication protocol that may be used for establishing such a direct channel of communication.

The ability to establish a direct channel of communication, without an intermediate server, can be advantageous in many use cases. For example, as described above, near to real-time parental control can be implemented, without latency issues that may arise when a server is used to aggregate requests and authorizations and distribute the requests and authorizations to various devices. Another example includes local area network (LAN) authorizations for media access control, e.g., when local channels of communication such as Wi-Fi, Bluetooth, etc., are used to carry a message directly between an authorizer and a requestor. In environments such as the home, vehicle, airplane, airport, etc., LAN authorizations may be useful when a child wishes to watch a movie or listen to music on a tablet computer but requires authorization from a parent that is located in the same environment. By avoiding the use of a server located in the internet, the above-noted latency issues, as well as charges for bandwidth usage, can be avoided.

It has also been found that the use of an intermediate server (e.g., an internet-based authorization server) can create a further failure point in a communication system. For example, if the server is down, no authorization requests can be processed during the outage. Also, in an enterprise environment, an organization may wish to avoid authorization requests such as those described above, going through a cloud infrastructure or internet for various reasons such as security. When those exchanging the messages are located within the same building or geographical area, the use of a local network may be more appropriate.

Figure 20:
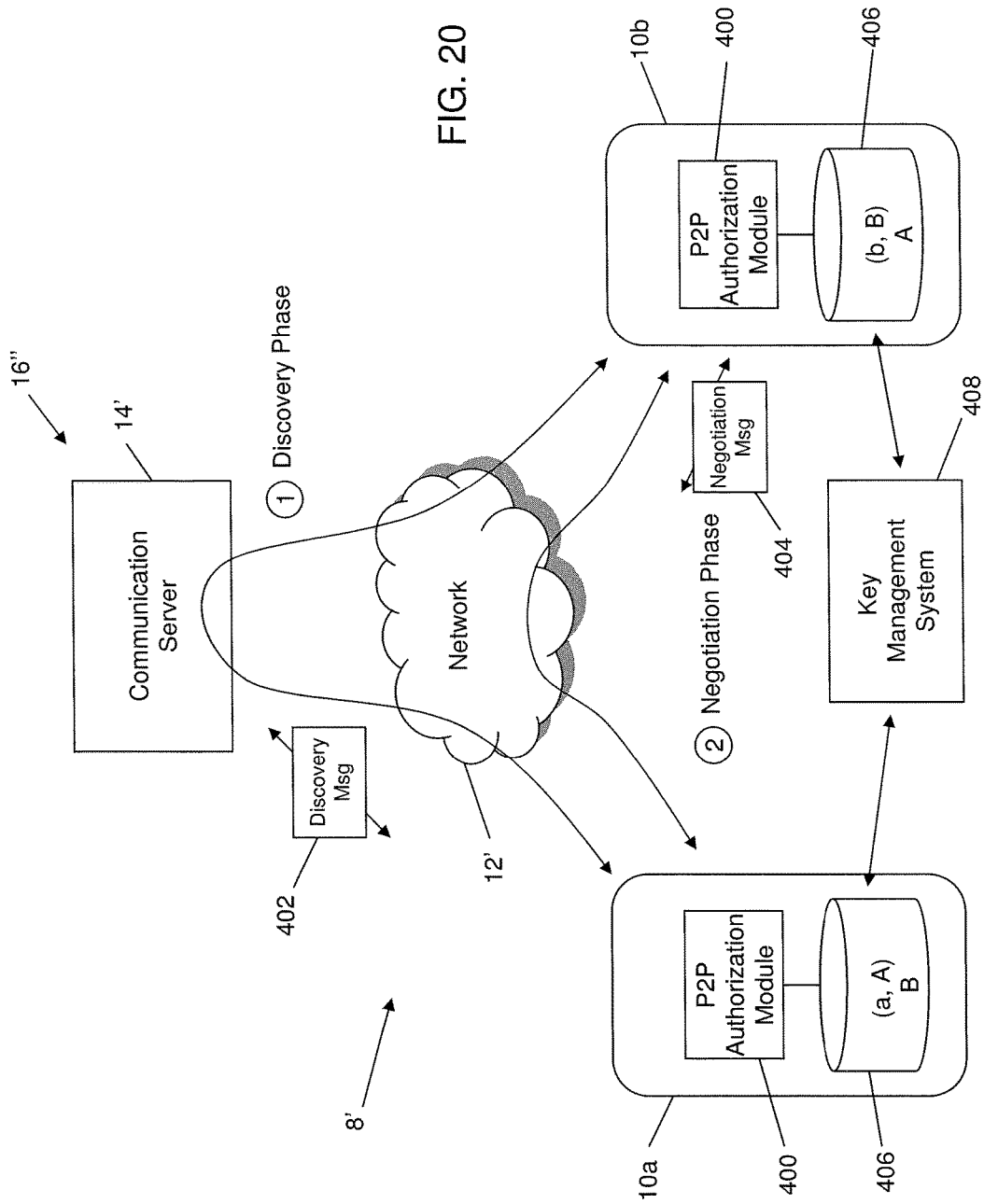
FIG. 20 is a block diagram of an example of a communication system.

Turning now to FIG. 20, a communication system 8' is shown, which includes one or more networks 12' (one network 12' being shown in FIG. 20 for ease of illustration) that are accessible by a plurality of mobile devices 10. It can be appreciated that although mobile devices 10 are shown in FIG. 20, the principles described herein may also apply to scenarios in which at least one of the devices in the communication system 8' is a non-mobile device such as a desktop computer. The mobile devices 10 include a P2P authorization module 400 for either (or both) requesting permission to access media content, or granting or denying permission to the requester (e.g., as described above and shown in FIGS. 1 to 19). It can be appreciated that, in at least some examples, the P2P authorization module 400 shown in FIG. 20 may include, correspond to, or operate similarly to the media access control module 68 described above. The P2P authorization module 400 may, however, be used with or by other communication applications, e.g., for establishing P2P communication channels for other purposes such as file transfer, communicating, sharing presence and/or location information, etc.

In the example communication system 8' shown in FIG. 20, the mobile devices 10 may communicate with a communication server 14' during a first discovery phase by sending discovery messages 402. As explained below, the discovery messages 402 can be used to determine an address or other identifier that enables one mobile device 10 to communicate directly with another mobile device 10 via the network 12'. After participating in the discovery phase and locating the other mobile device 10, the mobile devices 10 establishing a P2P connection may participate in a second negotiation phase by exchanging negotiation messages 404. As explained in greater detail below, the negotiation messages 404 utilize a particular transport type (e.g., by encapsulating a request or response message using a particular format) to enable the mobile devices 10 to communicate directly with each other using the address or other identifier discovered in the first discovery phase.

The P2P authorization module 400 may also incorporate security by, for example, encrypting the negotiation messages 404. In the example shown in FIG. 20, each P2P authorization module 400 includes or otherwise has access to a memory 406 storing a respective cryptographic key pair (a, A), (b, B). In the example described below, the mobile devices 10 are operable to communicate within a public key infrastructure (PKI). The PKI in this example includes a key management system 408, which may include a server, software module, certificate authority, or any other entity or authority capable of generating and distributing keys. For example, a desktop computer application can be used to generate and distribute key pairs through connections with the mobile devices 10. The mobile devices 10 each store a private key, a corresponding public key, and a public key of at least one other mobile device 10. In this example, the first mobile device 10 stores a private key a, a corresponding public key A, and a public key B of the second mobile device 10. Similarly, the second mobile device 10 stores a private key b, the corresponding public key B, and the public key A of the first mobile device 10.

FIG. 21 illustrates a flow diagram including an example of a set of computer executable operations that may be performed in communicating in a peer-to-peer session. At 410, a first mobile device 10 participates in the first discovery phase to determine an address for at least one second mobile device 10 with which the first mobile device 10 is attempting to communicate. After determining an address at which the first mobile device 10 can reach the second mobile device 10, the first mobile device 10 participates in the second negotiation phase, at 412, in order to, for example, provide a request for access to media content, and obtain a response to the request from the second mobile device 10. The negotiation phase may include a single request-response transaction, or may open a communication channel for a predetermined amount of time or number of transactions, hereinafter referred to a session. The first mobile device 10 determines, at 414, whether or not the session has ended. If not, the negotiation phase may continue, at 412. Once the session is to end, the P2P communication channel is closed and the session ends, at 416.

In the following examples, the negotiation phase includes a request sent by a first mobile device 10 to a second mobile device 10, over an established P2P communication channel, to access a specified Uniform Resource Identifier (URI) set, which includes one or more URIs. A URI is a well established construct providing a string of characters used to identify a name or resource on the internet, e.g., user@company.com, http://company.com, etc.

FIG. 22 provides a flow diagram illustrating an example of a set of computer executable operations that may be performed in participating in a discovery phase for determining respective addresses for a peer-to-peer session. It can be appreciated that the discovery phase may be executed in several circumstances in which address identification is required. For example, the mobile devices 10 attempting to communicate with each other may enter the discovery phase the first time they make such an attempt. The discovery phase may also be used when an address attempted in a negotiation phase fails. For example, a previously used address may be used in a subsequent negotiation and, due to movement of the second mobile device 10 to a new address, the previous address is no longer valid. In such a scenario, the discovery phase can be executed to determine the new address at which to reach the second mobile device 10. Similar to the examples described above, the example shown in FIG. 22 illustrates a first mobile device 10 designated the Requestor, attempting to communicate with a second mobile device 10 designated the Authority, in order to obtain permission to access media content associated with a URI set. The terms Requestor and Authority will therefore be used in this example for ease of explanation.

At 418, the Requestor determines a candidate authority for approving a request to access a URI set. For example, a child may select a parent from a contact list or address book stored on the child's mobile device 10. A known address for the candidate authority is determined, at 420, e.g., by determining a phone number for sending an SMS message, a PIN for a P2P application 66, etc. As discussed above, the discovery phase is initiated in order to determine an address which may be used to communicate with the authority directly, e.g., an internet protocol (IP) addressed used on the network 12'. When such an address is not known, the discovery phase can be executed to utilize a known address such as a phone number to communicate with the Authority via the communication server 14'.

The Requestor sends a request message to the candidate Authority, at 422, using the known address determined at 420. The request message is received by the Authority via the communication server 14', at 424. The mobile device 10 of the Authority may be operable to determine whether or not to respond to discovery address requests, which may be done transparently to the user, or may involve an input from the user, e.g., using a prompt. The Authority determines, at 426, whether or not to respond to the request received at 424. If not, the request is discarded, at 428. If the Authority is to respond to the request, a response is sent, at 430, to the Requestor, which receives and processes the response, at 432. After receiving the response, at 432, the Requestor has an address in the network 12' at which the Requestor can reach the Authority, e.g., an internet protocol (IP) address. By having such an address, the Requestor can establish a direct P2P communication channel with the Authority and initiate the negotiation stage, at 434, in order to obtain permission for accessing media content associated with a URI set.

Figure 23:
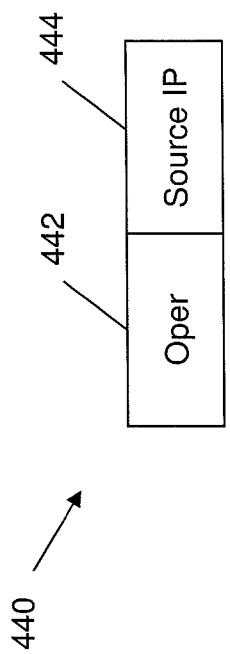
FIG. 23 is a block diagram of an example of a discovery request message.

FIG. 23 provides an example of a discovery address request message 440. The address request message 440 is based on a format specified by a communication protocol used by the communication server 14', in order for a known address to be used to discover an address in the network 12'. In the example shown in FIG. 23, the address request message 440 includes an SMS format and includes an Oper field 442 and a Source IP field 444. The Oper field 442 corresponds to the operation requested and includes a hexadecimal string. In one example, the values for the Oper field 442 may include: 0x01=>Peer's Address Request; 0x02=>Peer's Address Response; 0x11=>Peer's Authorization Request; and 0x12=>Peer's Authorization Response. The Source IP field 444 specifies an IP address of the source peer, in this example, the Requestor.

Figure 24:
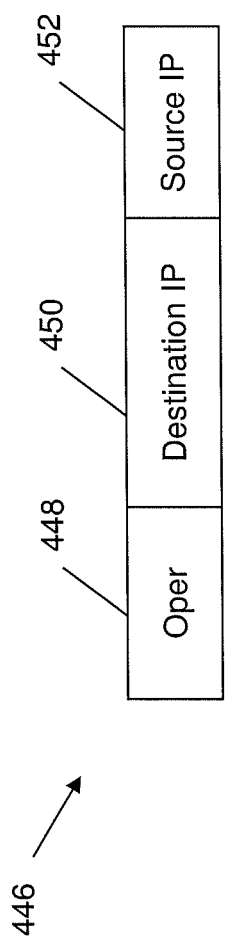
FIG. 24 is a block diagram of an example of a discovery response message.

FIG. 24 provides an example of a discovery address response message 446. The address response message 446 is based on the same format and protocol used for the address request message 446. In the example shown in FIG. 24, the address response message 446 includes an SMS format and includes an Oper field 448, a Destination IP field 450, and a Source IP field 452. The Oper field 448 is similar to the Oper field 442 of the address request message 440 but specifies the hexadecimal value 0x02. The Destination IP field 450 is used to specify the IP address of the destination peer, in this example, the Authority. The Source IP field 452 specifies the IP address of the Requestor.

Figure 25:
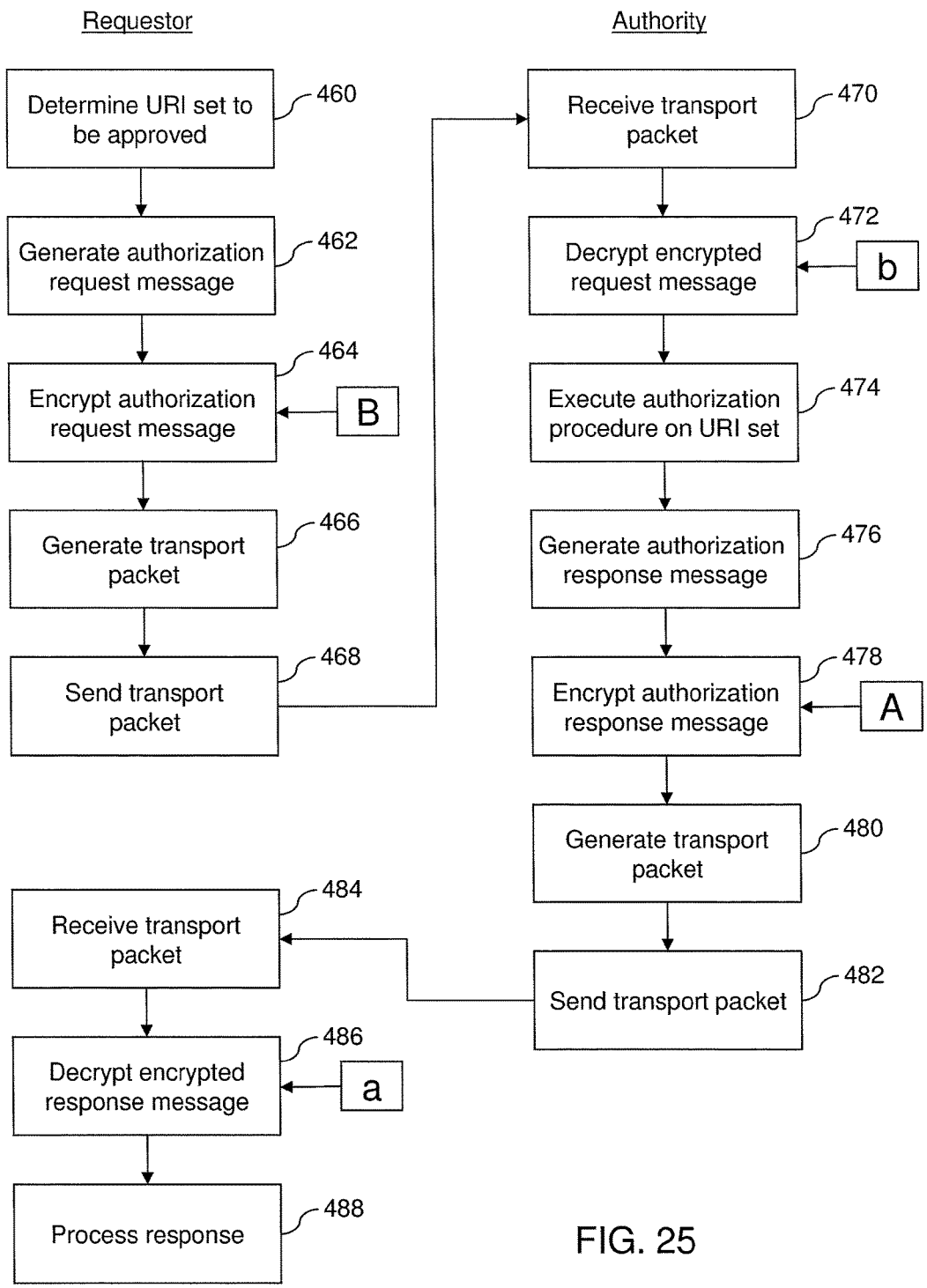
FIG. 25 is a flow diagram illustrating an example of a set of computer executable operations that may be performed in participating in a negotiation phase for obtaining authorization for a uniform resource identifier (URI)

FIG. 25 illustrates an example of a set of computer executable operations that may be performed in participating in a negotiation phase for obtaining authorization for a URI set. The negotiation phase is executed using a direct communication protocol using the addresses exchanged during the discovery phase. In the example described above, IP addresses are exchanged in the discovery phase and, using those IP addresses, the negotiation phase may proceed using messages having a format that utilizes IP addressing, e.g., transmission control protocol (TCP) messages. The TCP messages used in the negotiation phase include URI sets indicating a name or resource on the internet for which authorization to access is being requested. At 460, the Requestor determines the URI set to be approved, which may include one or more URIs. An authorization request message including the URI set is generated, at 462, and the authorization request message is encrypted using the public key B of the Authority. A transport packet is generated, at 466, which in this example, includes encapsulating the authorization request message in a TCP packet. The transport packet is sent to the Authority, at 468, and the Authority receives the transport packet, at 470.

The Authority uses its private key b to attempt to decrypt the encrypted message encapsulated in the transport packet, at 472. After decrypting the authorization request message, an authorization procedure is executed based on the URI set included in the decrypted message. The authorization procedure being used can vary according to the application utilizing the P2P authorization module 400. For example, the authorization procedure may incorporate operations described above with respect to parental control, e.g., utilizing prompts, handling dispute resolutions, etc. After executing an authorization procedure on the URI set, an authorization response message is generated, at 476. The authorization response includes information pertaining to a particular authorization request, and is encrypted by the Authority using the public key A of the Requestor, at 478. A transport packet is then generated, at 480, and the transport packet sent to the Requestor, at 482. The Requestor receives the transport packet, at 484, and decrypts the encrypted response message, at 486, using the Requestor's private key a. The response may then be processed, at 488, e.g., by granting or denying permission to access the URI set.

Figure 26:
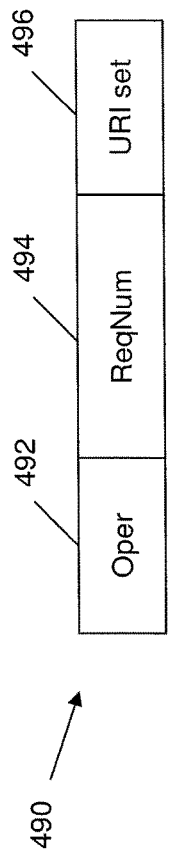
FIG. 26 is a block diagram of an example of an authorization request message.

FIG. 26 provides an example of an authorization request message 490. The authorization request message 490 includes a format specified by the transport type used to communicate between peers on the network 12', e.g., a TCP format. The authorization request message 490 includes an Oper field 492, a ReqNum field 494, and a URI set field 496. The Oper field 492 specifies the hexadecimal value 0x11. The ReqNum field 494 specifies a pair of bytes that contain a request number, which is incremented for each new request to enable requests to be differentiated. If the ReqNum field 494 overflows, it may be zeroed instead of being incremented. The ReqNum field 494 specified in the authorization request message 490 will be used in any response (i.e. even if multiple respondents) in order to match responses to requests.

Figure 27:
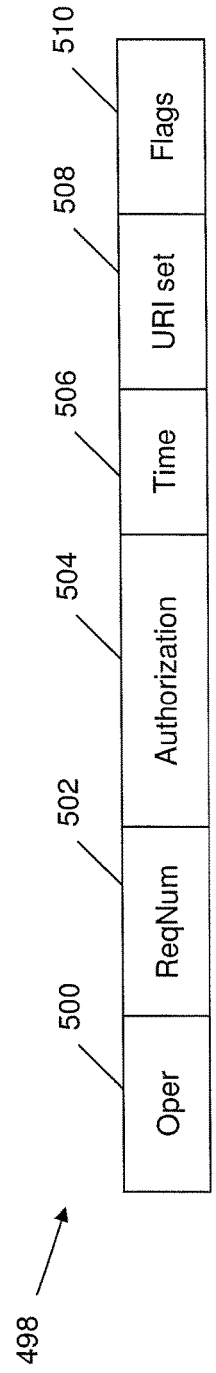
FIG. 27 is a block diagram of an example of an authorization response message.

FIG. 27 provides an example of an authorization response message 498. The authorization response message 498 has the same format as the authorization request message 490, e.g., a TCP format. The authorization response message 498 includes an Oper field 500, which in this example specifies a hexadecimal value 0x12; a ReqNum field 502, which is the same as the corresponding request; an authorization field 504; a time field 506; a URI set field 508, which identifies the URI set being authorized by the respondent; and a flags field 510. The authorization field 504 includes a one byte code identifying the given authorization. For example, the following authorization mapping can be used:

0x01—Temporary authorization: The URI set specified in the authorization response message 490 is temporarily authorized, wherein the time field 506 is used to specify for how long the authorization is valid.

0x02—Permanent authorization: The URI set specified in the authorization response message 490 is permanently authorized.

0xFF—Rejected: The URI set specified in the authorization response message 490 is not authorized.

0x03—Authority Not Available: The Authority or "authorizer" is not available.

0x04—Authority Could Not Verify: The Authority could not verify the URI, for example, if the Authority could not load the URI in a browser or other application to verify its content.

The time field 506 in this example provides four bytes containing a time value in seconds which, as described above, may be used to specify for how long a temporary authorization will last.

The flags field 510 may include multiple bits (e.g., eight). In one example, the flags field 510 contains 8 bits: 0xSUUUUUUU. The first bit in this example is the S bit, and all response packets with the same ReqNum 502 have the S bit set to 1 (ON), except for the last packet. In this way, the flags field 510 can be used to indicate when the list of URIs ends. If the bit is 1, one should expect another URI in the sequence. If the bit is 0, no further URIs are expected to appear in the list and the current URI is the end of the list. The other bits in the flags field 510 shown above are unspecified (U), which can be reserved for other uses.

Figure 28:
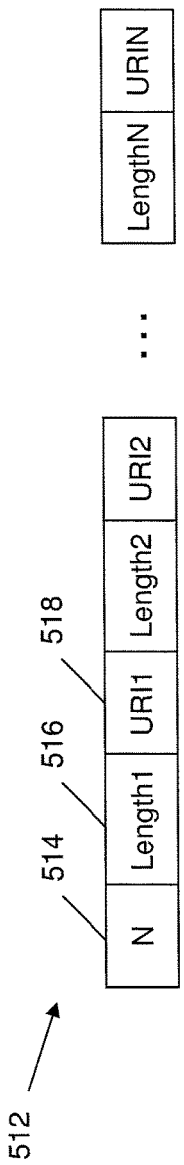
FIG. 28. is a block diagram of an example of a format for providing a set of URIs to be authorized.

The negotiation authorization messages 490, 498 include respective URI set fields 496, 508. FIG. 28 provides an example of a format for providing a set of URIs to be authorized. The URI set 512 shown in FIG. 28 includes an N field 514, for specifying the number of URIs in the URI set 512. The URI set 512 also includes a length field 516 and URI 518 for each in the set.

It can be appreciated that various restrictions may be imposed during the negotiation phase, depending on the application using the protocol. For example, the URI set 508 in the authorization response message 498 may be restricted to an array of URIs chosen only from those sent by the Requestor. Each URI Set 496, 508 may also be restricted to being associated with only one authorization code (specified in the authorization field 504) and time value (specified in the time field 506). A URI may also be restricted to being in only a single array element.

The flags in the flags field 510 can be used to specify a bit set such that all messages except the last message include the same bit set. For example, if a list of 3 URIs is provided, three packets may be sent. The first two packets have the bit S set to 1, and the third packet has the S bit set to 0. This allows the Authority to recognize the last packet in the sequence.

Figure 29:
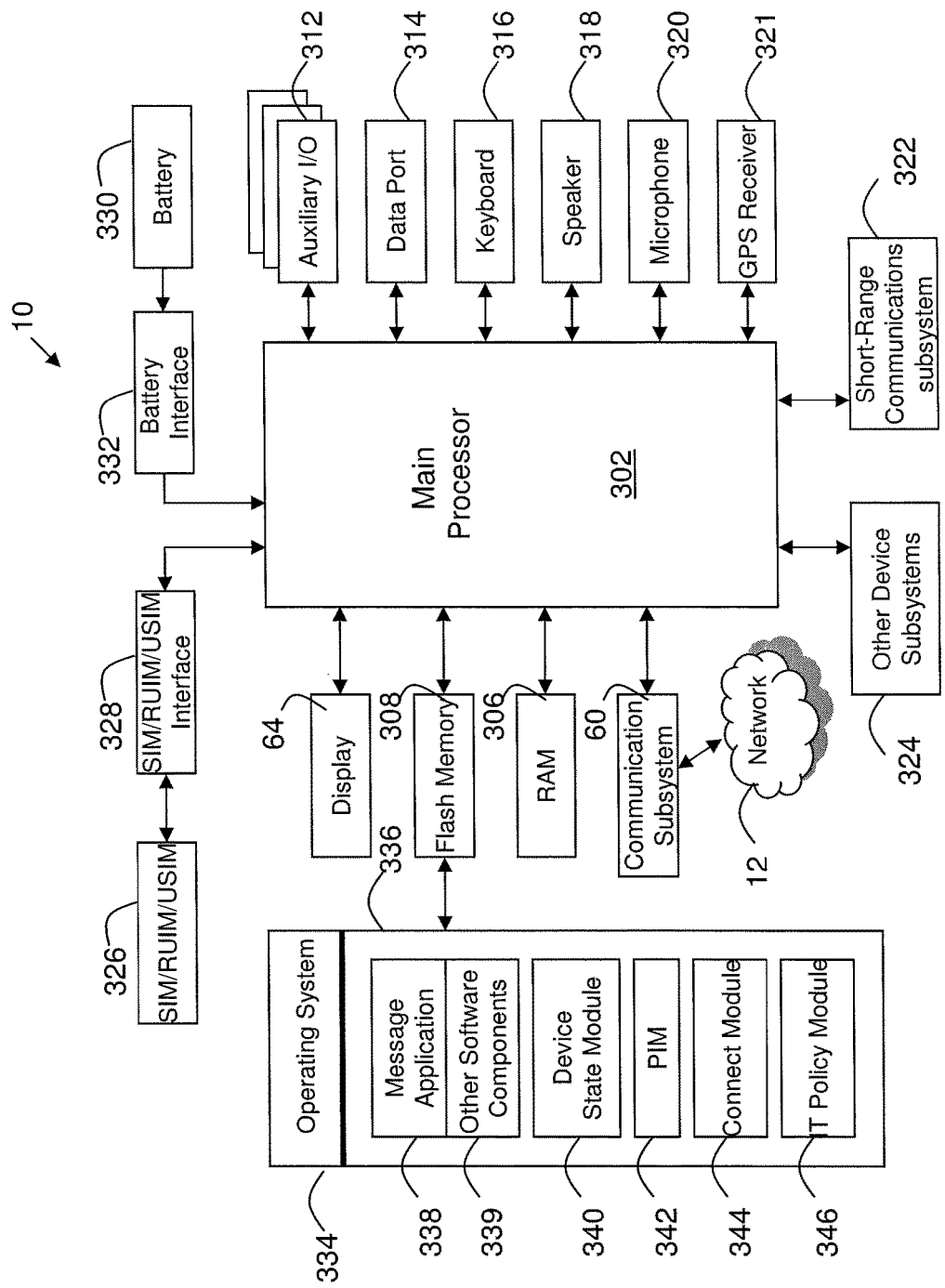
FIG. 29 is a block diagram of an example of a configuration for a mobile device.

Referring now to FIG. 29, shown therein is a block diagram of an example of a mobile device 10. The mobile device 10 includes a number of components such as a main processor 302 that controls the overall operation of the mobile device 10. Communication functions, including data and voice communications, are performed through a communication subsystem 60. The communication subsystem 60 receives messages from and sends messages to a wireless network 12. In this example of the mobile device 10, the communication subsystem 60 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication subsystem 60 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 302 also interacts with additional subsystems such as a Random Access Memory (RAM) 306, a flash memory 308, a display 64, an auxiliary input/output (I/O) subsystem 312, a data port 314, a keyboard 316, a speaker 318, a microphone 320, GPS receiver 321, short-range communications subsystem 322 and other device subsystems 324.

Some of the subsystems of the mobile device 10 perform communication-related functions, whereas other subsystems may provide "resident" or on-device functions. By way of example, the display 310 and the keyboard 316 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 326 is to be inserted into a SIM/RUIM/USIM interface 328 in order to communicate with a network. The SIM/RUIM/USIM 326 may store additional subscriber information for a mobile device as well, including datebook (or calendar) information and recent call information. Alternatively, user identification information can also be programmed into the flash memory 308.

The mobile device 10 is typically a battery-powered device and includes a battery interface 332 for receiving one or more batteries 330 (typically rechargeable). In at least some examples, the battery 330 can be a smart battery with an embedded microprocessor. The battery interface 332 is coupled to a regulator (not shown), which assists the battery 330 in providing power V+ to the mobile device 10. Although current technology makes use of a battery, future technologies such as micro fuel cells may provide the power to the mobile device 10.

The mobile device 10 also includes an operating system 334 and software components 336 to 346 which are described in more detail below. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Other software applications include a message application 338 that can be any suitable software program that allows a user of the mobile device 10 to send and receive electronic messages. Various alternatives exist for the message application 338 as is well known to those skilled in the art. Messages that have been sent or received by the user are typically stored in the flash memory 308 of the mobile device 10 or some other suitable storage element in the mobile device 10. In at least some examples, some of the sent and received messages may be stored remotely from the mobile device 10 such as in a data store of an associated host system that the mobile device 10 communicates with.

The software applications can further include a device state module 340, a Personal Information Manager (PIM) 342, and other suitable modules (not shown). The device state module 340 provides persistence, i.e. the device state module 340 ensures that important device data is stored in persistent memory, such as the flash memory 308, so that the data is not lost when the mobile device 10 is turned off or loses power.

The mobile device 10 may also comprise a connect module 344, and an IT policy module 346. The connect module 344 implements the communication protocols that are required for the mobile device 10 to communicate with the wireless infrastructure and any host system, such as an enterprise system, that the mobile device 10 is authorized to interface with.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 12, the auxiliary I/O subsystem 312, the data port 314, the short-range communications subsystem 322, or any other suitable device subsystem 324. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 314 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 314 can be any suitable port that enables data communication between the mobile device 10 and another computing device. The data port 314 can be a serial or a parallel port. In some instances, the data port 314 can be a Universal Serial Bus (USB) port that includes data lines for data transfer and a supply line that can provide a charging current to charge the battery 330 of the mobile device 10.

The short-range communications subsystem 322 provides for communication between the mobile device 10 and different systems or devices, without the use of the wireless network 12. For example, the subsystem 322 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 60 and input to the main processor 302. The main processor 302 may then process the received signal for output to the display 310 or alternatively to the auxiliary I/O subsystem 312. A subscriber may also compose data items, such as e-mail messages, for example, using the keyboard 316 in conjunction with the display 310 and possibly the auxiliary I/O subsystem 312. The auxiliary I/O subsystem 312 may include devices such as: a touch screen, mouse, track ball, track pad, optical navigation module, infrared fingerprint detector, or a roller wheel with dynamic button pressing capability. The keyboard 316 is an alphanumeric keyboard and/or telephone-type keypad. However, other types of keyboards may also be used, such as a virtual or "soft" keyboard rendered as images on a touch screen. A composed item may be transmitted over the wireless network 12 through the communication subsystem 60.

For voice communications, the overall operation of the mobile device 10 in this example is substantially similar, except that the received signals are output to the speaker 318, and signals for transmission are generated by the microphone 320. Alternative voice or audio I/O subsystems, such as a voice message recording subsystem, can also be implemented on the mobile device 10. Although voice or audio signal output is accomplished primarily through the speaker 318, the display 310 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the communication system 8, etc., or accessible or connectable thereto. Any application or module herein described may be implemented using computer readable/executable instructions that may be stored or otherwise held by such computer readable media.

Accordingly, there is provided a method of providing access to media on a first mobile device, the method comprising: sending a first request to a second mobile device using a messaging protocol, the first request being associated with access to media using the first mobile device; sending a second request to a third mobile device using the messaging protocol; receiving a response via the messaging protocol, the response having been provided by any one or more of the second mobile device and the third mobile device; and setting permission for access to the media according to the response.

There is also provided a non-transitory computer readable storage medium comprising computer executable instructions for providing access to media on a first mobile device, the computer executable instructions comprising instructions for: sending a first request to a second mobile device using a messaging protocol, the first request being associated with access to media using the first mobile device; sending a second request to a third mobile device using the messaging protocol; receiving a response via the messaging protocol, the response having been provided by any one or more of the second mobile device and the third mobile device; and setting permission for access to the media according to the response.

There is also provided a first mobile device comprising a processor, a display, and memory, the memory comprising computer executable instructions for causing the processor to: send a first request to a second mobile device using a messaging protocol, the first request being associated with access to media using the first mobile device; send a second request to a third mobile device using the messaging protocol; receive a response via the messaging protocol, the response having been provided by any one or more of the second mobile device and the third mobile device; and set permission for access to the media according to the response.

There is also provided a method of a first mobile device controlling access to media on a second mobile device, the method comprising: receiving at the first mobile device, a request from the second mobile device using a messaging protocol, the request being associated with access to media using the first mobile device and also having been sent to a third mobile device using the messaging protocol; and sending a response via the messaging protocol, the response setting permission for access to the media using the second mobile device.

There is also provided a non-transitory computer readable storage medium comprising computer executable instructions for a first mobile device controlling access to media on a second mobile device, the computer executable instructions comprising instructions for: receiving at the first mobile device, a request from the second mobile device using a messaging protocol, the request being associated with access to media using the first mobile device and also having been sent to a third mobile device using the messaging protocol; and sending a response via the messaging protocol, the response setting permission for access to the media using the second mobile device.

There is also provided a first mobile device operable to control access to media on a second mobile device, the first mobile device comprising a processor, a display, and memory, the memory comprising computer executable instructions for causing the processor to: receive at the first mobile device, a request from the second mobile device using a messaging protocol, the request being associated with access to media using the first mobile device and also having been sent to a third mobile device using the messaging protocol; and send a response via the messaging protocol, the response setting permission for access to the media using the second mobile device.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of providing access to media provided by a media service, the method comprising:
   sending a first request by the media service to a first device using a messaging protocol, the first request comprising a first request for a first decision to grant permission to access particular media using the media service;
   sending a second request by the media service to a second device using the messaging protocol, the second request comprising a second request to for a second decision to grant permission to access the particular media using the media service, wherein the messaging protocol utilizes a respective personal identification number associated with each of the first device and the second device;
   receiving, at the media service via the messaging protocol:
   a first response from the first device based on sending the first request, the first response indicating the first decision as one of approving or denying permission to access the particular media; and
   a second response from the second device based on sending the second request, the second response indicating the second decision as one of approving or denying permission to access the particular media;
   determining that the first response and the second response comprise indications that are not compatible;
   initiating a dispute resolution between the first response and the second response based on determining that the first response and the second response comprise indications that are not compatible; and
   permitting or denying access to the particular media provided by the media service according to the dispute resolution.

2. The method of claim 1, wherein the second request is sent after the first request.

3. The method of claim 1, wherein the first and second requests are sent substantially at the same time.

4. The method of claim 1, further comprising displaying the first request, the second request, and the first response in an instant messaging conversation user interface available to the first and second devices.

5. The method of claim 1, wherein the media comprises at least one of music, streaming music, video, or social networking.

6. The method of claim 1, comprising sending one of the first request and the second request before the other of the first request and the second request according to availability information associated with the first device and second devices.

7. The method of claim 1, where the first request for permission and the second request for permission is independent of the particular media being present on any of the first device or the second device.

8. The method of claim 1, wherein at least one of:
   the first response is based upon a first input received from an operator of the first device, or
   the second response is based on a second input received from an operator the second device.

9. The method of claim 1, wherein the sending the first request and the sending the second request is performed prior to receiving either of the first response or the second response.

10. A method of controlling access to media on a first device by a second device, the method comprising:
    receiving at the second device, a request from the first device using a messaging protocol, the request comprising a request for permission to access particular media using the first device, a similar request also having been sent to a third device from the first device using the messaging protocol wherein the messaging protocol utilizes a respective personal identification number associated with each of the second device and the third device;
    sending a response from the second device to the first device via the messaging protocol, the response indicating one of approving or denying the request for permission to access to the particular media by the first device;
    receiving at the second device, based on sending the response, a dispute resolution request;
    displaying, the request, the similar request, and the response in an instant messaging conversation user interface available to the first, second, and third devices;
    receiving, based on receiving the dispute resolution request, a user input at the second device indicating a dispute resolution selection; and
    sending to the first device, based on receiving the dispute resolution request and based on receiving the dispute resolution selection, a dispute resolution response indicating the dispute resolution selection.

11. The method of claim 10, further comprising providing the response to at least one additional device.

12. The method of claim 10, further comprising:
    receiving a message indicating that another response to the request provided to the third device is incompatible with the response provided by the second device,
    where the displaying further comprises displaying a response sent by the third device in response to the similar request, and
    where the dispute resolution request comprises a request to resolve an incompatibility between the response and the response sent by the third device in response to the similar request.

13. The method of claim 10, wherein the particular media comprises at least one of music, streaming music, video, or social networking.

14. The method of claim 10, further comprising enabling the particular media associated with the request to be viewed.

15. The method of claim 10, where the sending of the response is independent of the particular media being present on any of the first device or the second device.

16. A second device operable to control access to media on a first device, the second device comprising a processor, a display, and memory, the memory comprising computer executable instructions for causing the processor to:

receive at the second device, a request from the first device using a messaging protocol, the request comprising a request for permission to access particular media using the first device, a similar request also having been sent to a third device from the first device using the messaging protocol wherein the messaging protocol utilizes a respective personal identification number associated with each of the second device and the third device;

send a response from the second device to the first device via the messaging protocol, the response indicating one of approving or denying the request for permission to access to the particular media by the first device;

receive at the second device, based on sending the response, a dispute resolution request;

display, the request, the similar request, and the response in an instant messaging conversation user interface available to the first, second, and third devices;

receive, based on receiving the dispute resolution request, a user input at the second device indicating a dispute resolution selection; and send to the first device, based on receiving the dispute resolution request and based on receiving the dispute resolution selection, a dispute resolution response indicating the dispute resolution selection.

17. The second device of claim 16, wherein the particular media comprises at least one of music, streaming music, video, or social networking.

18. The second device of claim 16, wherein the computer executable instructions further cause the processor to provide the response to at least one additional device.

* * * * *